United States Patent [19]

Athas et al.

[11] Patent Number: 5,047,917
[45] Date of Patent: Sep. 10, 1991

[54] APPARATUS FOR INTRASYSTEM COMMUNICATIONS WITHIN A BINARY N-CUBE INCLUDING BUFFER LOCK BIT

[75] Inventors: William C. Athas, Sandy, Utah; Reese Faucette, Pasadena; Charles L. Seitz, San Luis Rey, both of Calif.

[73] Assignee: The California Institute of Technology, Pasadena, Calif.

[21] Appl. No.: 303,977

[22] Filed: Jan. 31, 1989

Related U.S. Application Data

[63] Continuation of Ser. No. 754,828, Jul. 12, 1985, abandoned.

[51] Int. Cl.$^5$ ............................................. G06F 15/16
[52] U.S. Cl. ................... 364/200; 364/229.5; 364/239; 364/280.9
[58] Field of Search ... 364/200 MS File, 900 MS File

[56] References Cited

U.S. PATENT DOCUMENTS

| | | | |
|---|---|---|---|
| 3,984,819 | 10/1976 | Anderson | 364/200 |
| 4,247,892 | 1/1981 | Lawrence | 364/200 |
| 4,488,218 | 12/1984 | Grimes | 364/200 |
| 4,498,134 | 2/1985 | Hansen et al. | 364/200 |
| 4,499,576 | 2/1985 | Fraser | 370/60 |
| 4,503,535 | 3/1985 | Budde et al. | 364/200 |
| 4,543,630 | 9/1985 | Neches | 364/200 |
| 4,598,400 | 7/1986 | Hillis | 370/94 |
| 4,601,586 | 7/1986 | Bahr et al. | 370/94 |
| 4,621,359 | 11/1986 | McMillen | 370/94 |
| 4,630,260 | 12/1986 | Toy et al. | 370/60 |

OTHER PUBLICATIONS

"The Extension of Object-Oriented Languages to a Homogenous, Concurrent Architecture", by Charles R. Lang, California Institute of Technology, dated May 24, 1982.
"A Large Scale, Homogeneous, Fully Distributed Parallel Machine I and II", by H. Sullivan et al., pp. 104-124, Mar. 1977.
*Data and Computer Communications,* by Stallings, published 1/1985, pp. 124-143, 189-207.
*AT&T Bell Laboratories Tech. Jrnl.,* vol. 63, No. 8, Oct. 1984, "The Unix System: Multiprocessor Unix Operating Systems", pp. 1733-1749 by Bach et al.
*Electronics,* 7/28/83, "Unix Operating Systems=Univ Variant Opens a Path to Managing Multiprocessor Systems", by Paul Jackson, pp. 118-124.
*Data and Computer Communications,* by Stallings et al., pp. 158-161 and 458-461 © 1985, published Jan. 1, 1985.

*Primary Examiner*—Lawrence E. Anderson
*Attorney, Agent, or Firm*—Donald A. Streck; Edward O. Ansell; Elgin Edwards

[57] ABSTRACT

An improved communication system for the prevention of lockup in a computer system of the binary n-cube type. Input circuitry at each of the nodes is connected for receiving messages and includes an input buffer for initially receiving the messages. Output circuitry at each of the nodes is connected for transmitting holding the messages prior to and during transmission thereof. A kernel program at each of the nodes acts as an interface between the user process programs and exclusively controls the receiving and transmitting of messages into and out of the node. There is provision for the user process programs to pass control to the kernel program to request the sending and receiving of messages by the kernel program. A lock bit is associated with each message, sensible by the user process programs, and reset by the kernel program when the kernel program has transferred the associated message. Asynchronous transfer circuitry independently and asynchronously transfers the messages as packets between the buffers of the nodes. There is logic for various decisional matters regarding message sending and receipt. There is blockout prevention logic for refusing to receive a message unless a user process program in the node has reserved a buffer of sufficient size to receive the message and for listing messages waiting to be received for which space has not yet been reserved.

7 Claims, 11 Drawing Sheets

APPARATUS FOR INTRASYSTEM COMMUNICATIONS WITHIN A BINARY N-CUBE INCLUDING BUFFER LOCK BIT

BACKGROUND OF THE INVENTION

1. Origin of the Invention

The work leading to the development of this invention was sponsored by the Defense Advanced Research Projects Agency, ARPA Order 3771, and monitored by the Office of Naval Resarch under Contract N00014-79-C-0597.

This application is a continuation of application Ser. No. 754,828 filed 12 July 1985, now abandoned.

2. Field of the Invention

This invention relates to a message-passing concurrent computing system. Numerous concurrently-operable computers retain a physically close and fast electrical connection between processors and storage and use a separate mechanism (e.g., communication channel) for transfer of data between them. The network of communications channels may be an array of any number of dimensions, but the preferred embodiment hereindescribed employs a binary n-cube.

An intermediate host IH computer is cabled to one corner of the binary n-cube for running network and operating system software, and in selected instances running some small auxiliary computations. These auxiliary computations support the vast number of computations that are running concurrently in the primary computer system.

The sequential computers, called "nodes," compute concurrently on parts of a single computing problem. These computers coordinate their individual parts of a computation entirely by sending messages to each other through point-to-point, bidirectional, asynchronous communication channels which includes "queues," or message buffer storage units. A message format and priority system, in accordance with this invention, deals with congestion by queueing messages so that the messages move in an orderly manner throughout the nodes.

The plurality of small node computers run concurrently and coordinate their individual parts of a computation with other individual computers. The coordination of the computation involves a unique message-passing communication network which links the N nodes (numbered 0,1 ----, N−1) together in a binary (or Boolean) n-dimension cube in which $N=2^n$ or $n=\log_2 N$. The intermediate host (IH) computer connects between node 0 and local networks, and provides program loading and input/output functions.

Nodes are connected by (physical) bidirectional communication channels structured to form a binary n-cube; that is, node i is connected to nodes $i+2^k$ by channel k, where $k=0, \ldots n-1$, and + is the bitwise mod-2 sum (or "XOR"). The assignee is currently operating 8-node, or 3-cube, and 64-node, or 6-cube, concurrent processing systems. These systems are referred to herein as cosmic cubes.

The cosmic cube nodes, in a preferred embodiment, have 128 K bytes of primary storage. Each node uses an Intel 8086 instruction processor and an Intel 8087 floating point arithmetic coprocessor. While the Intel units are discussed in the following description and definitions, it must be understood that the invention is not so limited.

Each node also includes six communication channels (except that node 0 has seven channels to accommodate a communication channel connection with the IH computer). Each node also includes diagnostic programs and storage for initialization and loading the operating system on a cold-start basis.

3. Background Discussion

Multiprocessors are well known and a plurality of such processors have been used to concurrently execute problem solving. FIG. 1 includes in block form two common prior art approaches. Most concurrent multiprocessor systems are structured through a switching network between the processors ($P_0, P_1 \ldots P_7$) and storage modules ($S_0, S_1 \ldots S_7$), as shown by FIG. 1A. U.S. Pat. No., 4,484,262 issued to Sullivan et al. typifies this type of prior art which is clearly distinct from this invention.

FIG. 1B depicts another typical prior art diagram which shows a shared communication channel that is used by the processors and storage modules.

The memory switching network, FIG. 1A, is a distinct disadvantage in concurrently executing multiprocessor systems. The switching network introduces a storage access latency into the system and also forces a rigorous "hand-shaking" discipline into the total system approach. As a result, this type of prior art system does not scale well to a large and high-speed computer system.

Other prior art systems, such as that described in U.S. Pat. No. 4,164,787 to Aran Guren, require a synchronous master clock, and share a common memory for random access. Blocks of memory are employed for doing read or write operations. Such systems, while reducing the amount of "hand shaking" between multiple microprocessor units, still share a common memory and are not amenable to large problem solutions. Moving messages throughout a system in an orderly fashion, as in this invention, clearly distinguishes over this shared memory body of prior art. Such a message-passing approach yields high efficiency for concurrent processing, which efficiency is not approachable by the shared memory art.

The cosmic cube of this invention evolved over the course of the last few years, and a historical perspective is deemed helpful in order to set forth the prior art and the distinctions over that art as described and claimed in this patent application.

Theoretical inspiration to the work was due, in part, to research at the assignee in the 1978-1980 period. That research was comparable in concept to a 1977 paper by Herbert Sullivan and T. L. Brashkow entitled "A Large Scale Homogeneous Machine I & II," Proceedings 4th Annual Symposium on Computer Architecture, pages 105-124.

A modeling and simulation effort as background to the cosmic cube development was reported in a prior art thesis submitted to the assignee in May 1982 by Charles Richard Lang, Jr. ("Lang thesis"). The Lang thesis will be described briefly as background information that is relevant to the cosmic cube invention.

The Lang thesis sets forth known prior art background which includes a homogeneous machine as a collection of nominally identical processors, each with its own storage. These processors (or "nodes") execute programs concurrently, and pass messages over a regular communication structure. Included within that broadest category of a communication structure is a Boolean n-cube interconnection which, per se, was noted as well known.

A Boolean n-cube connection is depicted at FIGS. 4–5, page 116 of the Lang thesis, and is described at pages 115 through 155. The Sullivan paper is noted in the Lang thesis as presenting an apparently unrecognized message-passing system which avoided a "deadlock" situation. (Deadlock avoidance is described in greater detail in Definition 4.17 of the Section 4 definitions presented hereinafter.) While Lang posed the problem of deadlocking, the Lang thesis went no further than to set the study stage and objectives to avoid deadlocking.

In a binary n-cube situation, the Lang thesis simulated a queued first-in-first-out (FIFO) memory for each output communication link, all of which are well known in this art. It was assumed by Lang, without structural support or means for solution, that incoming packets will always be able to eventually find a place in node memory. From his various simulations, Lang concluded that the unrestricted Boolean n-cube ("NCUBE") and the restricted Boolean n-cube ("ECUBE") were the most promising candidates, page 154. At page 155 of the Lang thesis it is stated that:

> The relatively low duty cycle exhibited by the links in the Boolean n-cube suggests that contention networks with a limited number of nodes per bus might be used rather than point-to-point connections.

The system postulated by the Lang thesis, as stated, for example, at page 28, required an explicit reply from a destination process before the sender could execute another SEND or RECV action. That operation is overly restrictive and creates less concurrency. The Lang requirement is stated in part as follows:

> To preserve the sequence of operations programmed in the objects, one proviso must be added to the initiation of concurrent behavior. While an object sending a message to another object for which no response is indicated need not wait for execution of the attribute, it is necessary that the message be put in the attribute queue of the destination object before another message is sent by the originator. Property (2) [successive messages arrive in the order sent] of the message passing system is intended to assure, however implemented, that any messages that might be sent to the destination object as a result of further execution by the originator will be acted upon after the first message or under control of the attribute selection logic. Thus, the sequence of operations as specified by the programmer is preserved.

The queued communications of this invention, in contrast, include no automatic acknowledgment to the sender when the receiving process has taken the message. But for the message order preservation, this invention employs the most weakly synchronized, or most "loosly coupled" form of message communication. This "loosely coupled" mode of communication is motivated both by physical design considerations for this class of concurrent computer architectures, and also by the favorable effects in concurrent formulations of the resulting asynchrony between processes, and between processes and communications. When this weakly synchronized message communication is strengthened by the property of preserving message order between pairs of processes, the result is a set of message primitives that are (1) ideal for a very broad class of applications, and (2) sufficient to allow the strongest forms of message synchronization to be expressed.

Moreover, the message routing system of this invention has been realized by novel and nonobvious structure and methods not disclosed or suggested by the Lang thesis. The inventors of this application do not employ a contention system, nor have they limited the number of nodes per bus, as suggested by the Lang thesis. Indeed, this invention, in distinction, implements a Boolean n-cube system wherein message passing is sent from node to node through point-to-point, bidirectional asynchronous communication channels which include "queues." Each queue has a message header and an associated format and priority system that deals with congestion and avoids "deadlocking" by assuring orderly movement of messages throughout the nodes. In its broadest concept, this invention involves the basic discovery that, properly organized, a direct point-to-point n-cube concurrent multiprocessor system is overly adequate for a highly advantageous message-passing queued system capable of strong and robust computation capabilities.

4. Definitions

In order to simplify the understanding of the cosmic cube invention, certain generalized definitions are supplied.

4.1 Process. A "process" is the basic unit of computation in the cosmic cube. A process is a sequential program that includes system calls which cause messages to be sent and received. A single node may contain many processes. A computation consists of a collection of processes distributed through the cube that execute concurrently, either by virtue of being in different physical nodes, or by being interleaved in execution within a single node.

Programming for the cosmic cube involves a process model of computation as dictated by the hardware structure of the cosmic cube. Instead of formulating a problem to fit on nodes and on the physical communication channels that exist only between certain pairs of nodes, a problem is formulated in terms of processes and "virtual" communication channels that connect all processes.

A message system efficiently routes messages from any process to any other process. The placement of processes in physical nodes is controlled by a programmer, or may be deferred to a library process.

4.2 Process Structure. A set of processes and their reference to other processes is called a process structure.

4.3 Process Representation. A process representation is comprised of a code segment, a data segment and a stack segment, each having a bounded size. These segments are represented for communication purposes as binary images relocatable, in this representative example, by the segmentation features of the Intel 8086 processor. Facilities are provided for sharing code segments, as may occur when many copies of the same process, each with its own data and stack segments, are located in one node. Process code is dynamically relocatable within a node.

4.4 The Kernel. The resident operating system of the cosmic cube is called the "cosmic kernel," or just "kernel." The kernel supports the process abstraction that frees a programmer from having to formulate and express a concurrent computation in an overconstrained way.

One copy of the kernel resides in each node of the cosmic cube, and all of these copies are concurrently executable, each serving the processes within its own node. The kernel interleaves the execution of processes in each node, handles all details of message sending and receiving, and provides several other functions for program loading and debugging. The system calls that invoke kernel functions are implemented as interrupts.

4.5 Kernel Layers. The kernel has two layers. All those parts of the kernel with which user processes communicate directly by system calls are in the "inner kernel" (IK). The inner kernel supports message sending and receiving, message routing, process scheduling, storage management and error conditions.

All other kernel functions are invoked by sending messages to a set of processes called the "outer kernel" (OK). The outer kernel processes are user processes, and additionally provide functions such as debugging, process creation and process destruction.

The outer kernel is a privileged set of processes whose functions are invoked by messages rather than system calls. User processes will normally communicate with their own OK processes—the OK processes in the same node—but may equally communicate with any other OK processes. Messages that invoke different functions in an OK process are distinguished by message type. Throughout the description of this invention the "kernel" or "cosmic kernel" will generally be referred to unless a particular operation requires the more detailed reference to IK or OK.

4.6 Process Code. Process code may be written in any sequential programming language, e.g., Pascal, Fortran, C, assembly, etc., for which one has a compiler or assembler to the instruction set of the node processor. One can also mix processes written in different source languages in a single computation. The object code must adhere to certain restrictions in which the segmentation features of the Intel 8086 addressing are used to relocate process code. Although Intel 8086/8087 are used in describing this invention, it is obvious to those of skill in this art that the invention is broadly related to any conventional processors.

4.7 Input/Output. Processes that run in the cosmic cube nodes do not perform file and terminal I/0 directly. I/0 for processes that run in the cube nodes is, instead, accomplished by message-passing to processes in the intermediate host.

4.8 Intermediate Host (IH). The IH operates as a network server. User processes in the IH may use language processor utilities, in addition to sending and receiving messages.

4.9 Process ID. Each process has a unique identifier that is an ordered pair: process ID = <physical node, process number within the node>. This ID is represented in the preferred embodiment as the left and right bytes in a 16-bit word:

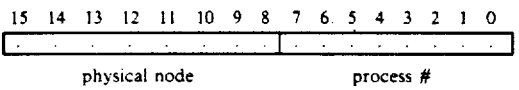

The physical node has a range 0:63 in the 6-cube, and 0:7 in the 3 cube. For both the 6-cube and 3-cube machines, IH processes have IDs <64,j>.

Although the process # byte has a range 0:255, process #'s in the range 128:255 are reserved for inner kernel message functions and for the outer kernel processes. Quite obviously, other configurations would suggest other limits for process numbers.

As noted earlier, a process will not be relocated from node to node. Thus, the physical node in which a process is located is designated within its ID. The kernel does not then maintain any centralized map from process ID to physical node. Message routing to processes is based simply on the physical address part of the destination found in the message header (see Definition 4.14).

4.10 Reserved Process IDs. Certain processes, <i,128> through <i,255>, for example, are reserved for system functions. User process IDs in node i are currently restricted to the range <i,0> to <i,127>.

Process <i,255> is used, for example, by the inner kernel to provide a sender label for error messages, and processes <i,240>:<i,248> are used or reserved for "behind the scenes" message protocols. The process IDs <i,128> and <i,129> are currently reserved for the OK in node i.

OK processes <i,129> provide direct interaction with the kernel for program debugging and monitoring, and are denoted <i,spy>.

OK processes <i,128> have capabilities of creating and destroying processes, and the associated capability of performing storage management within its own node, and are denoted <i,spawn>.

4.11 Process Cancellation ("Wipeout"). A process may cancel or "wipe out" a process in node i by a message to <i,spawn>.

A process automatically wipes itself out upon termination, and its space and process ID may then be reused.

Messages queued for a process are deleted along with the process.

4.12 Monitoring and Debugging. A variety of messages, distinguished by type, may be sent to the process <i,spy> in order to determine and change the state of processes in node i. Although such messages can be sent from any other process, they would most commonly be between the IH and <i,spy>.

In brief summary, the <i,spy> processes allows the sender:

(1) to obtain a list of processes in the node together with their present run state, segment registers and program counter.

(2) to obtain a list of pending SENDs and RECVs, and messages queued in the kernel message buffer and in incoming channels.

(3) to suspend or resume execution of any or all processes except for <i,spy>, which may not be suspended.

(4) to cancel a process, or change its ID.

(5) to read and write any word or contiguous block of words within the code segment (CS), data segment (DS), or stack segment (SS) of a process.

4.13 Kernel Message Format. The kernel supports one message format, and provides three functions: SEND, RECV and PROBE, to control message passing.

The principal distinctive features of the cosmic cube message passing are the following:

(1) Messages are queued in transit, but between any pair of processes, message order is preserved;

(2) The semantics of the message passing operations are independent of the placement of processes in nodes; and (3) Messages are passed by a self-timed request/acknowledge protocol over point-to-point bidirectional communication channels.

4.14 Message Headers. All messages have headers which appear at the beginning of a message, and in the preferred embodiment are one packet long. The kernel may determine by reading just the first packet of a message its destination and its length. Packets are never shuttled directly from incoming to outgoing channel. They are written into the kernel message buffer and then sent out from the kernel message buffer. If the kernel message buffer cannot accommodate the message, the interrupt for that incoming channel is turned "off," and the channel is effectively blocked until space becomes available. The output channel interrupts are normally "off," and are only turned "on" when a message is in progress through that channel. Headers are generated by the kernel as part of the message sending activity, and are separated from the message on receipt. The header is not considered to be part of the message, but can be thought of as the envelope in which a message is sent.

The header is four words long, and contains:

```
word 1: ID of the destination process
     2: ID of the sending process
     3: message type
     4: message length
```

Words 1 and 2 need no further description. The identification of word 1 is generated by a user process, while the kernel generates the ID of word 2. The message type, word 3, is significant in the way in which messages sent are matched against messages expected by the destination process. (See Definition 4.15 below.) The message length, word 4, is specified by the number of 8-bit bytes, not including the header, not to exceed 32K words (a 64K byte segment), and may be zero. A message of length zero is called a "synchronization message," and conveys information only through the type and by its existence.

4.15 Message Sending and Receiving. A process performs message sending and receiving by system calls implemented as interrupts. The two basic message calls are SEND and RECV. SEND and RECV may or may not result in the message being sent or received immediately. Thus, SEND and RECV do not "block" if the action cannot be performed immediately. Instead, if the action specified in a SEND or RECV cannot be performed immediately, a "request" is created that remains "pending" until it is satisfied. In this way program execution continues concurrently with many concurrently pending communication requests.

4.16 Message Storing and Buffering. Any primary storage of a node that is not used for processes is available to the kernel to buffer messages. This kernel message buffer is used both for messages for a process that has not yet executed a RECV for that message, and for messages in transmit being routed through a node.

A SEND and its corresponding RECV may occur in either order. Generally the RECV is executed before a message arrives at a node, since it is then delivered directly to the process rather than being kept in the kernel message buffer, where it must later be moved again.

4.17 Deadlock Avoidance. If messages did not move orderly through the nodes, a deadlock could occur. Deadlock could be introduced by the message-passing system only if all of the message buffers became full. Deadlocking or congestion may be analogized to four orthogonal traffic lanes wherein all four front cars simultaneously and aggressively converge into an intersection. Each driver expects the other to move, but the movement of any is physically impossible. In the cosmic cube, carrying the analogy to its logical next step, messages are always eventually consumed, so that there is always some space for cars (messages) to move. Messages are queued and routed so that a deadlock situation is avoided except in case of malfunctioning of equipment or improper programming. One way to make deadlocking impossible is to assure that computations are organized so that every message eventually gets consumed.

The kernel message buffer is used both for routing messages, and for queueing them for processes in the node.

4.18 The Message Descriptor. The SEND, RECV and PROBE system calls take as a single parameter, the data address of a six-word descriptor for the message to be sent. Successive words in the descriptor are:

(0) ID of the destination (SEND) or sender (RECV and PROBE)
(1) type
(2) address of the message
(3) actual length of the message, in words
(4) length of the message array (RECV) or unused (SEND and PROBE) length
(5) lock variable The message descriptor is the interface into the message-passing system. The details of the message operations are actually "hidden" in this descriptor. As a consequence, the user need not know what is actually taking place in the cosmic cube operation.

The lock variable is given values 0 and +1, which is compatible with the internal representation of FALSE and TRUE, respectively.

In SEND and RECV, the lock variable TRUE has the interpretation that the operation requested is still pending. The descriptor may be read but should not be written by process code while the lock is TRUE. As is described later, SEND (Definition 4.21) and RECV (Definition 4.22) will "block"—e.g., wait for the lock to become FALSE—if invoked while the lock is TRUE.

The lock is the basic synchronization mechanism between process execution and its concurrent message activities. The lock is a variable that can be tested by the process code, and allows concurrent message activities to be sensed and controlled in process execution.

4.19 The Message Tag. The cosmic kernel can use either the message descriptor or its own shortened version of that descriptor, called a message tag. Access to user processor memory is done only by message descriptors, and access into a node's buffer area is done only by message tags.

4.20 User Processes. User processes may reference intrinsic or external procedures. A copy of the procedures used, together with a copy of any external procedures used to invoke any specified functions, may be included with each process.

The code for each user process is compiled independently of the code of other processes that may be a part of the same computation. Because of the independence of the construction of process code, and the standardization of kernel functions, there is general compatibility of processes.

4.21 SEND Call. The SEND call passes the address of the six-word descriptor for the message to be sent.

```
SEND descriptor_address → destination ID
                         type
                         start address → msg data
                         length
                         unused (maximum length)
                         lock *
```

The six-word descriptor block includes (0) the ID of the process to which the message is to be sent, which will be included in the message header along with the header ID; (1) the message type to be included in the message header; (2) the starting address of the contiguous block of memory from which the message is to be sent; (3) the length of the message to be sent, in words, which will be included in the message header; (4) an unused word that is used to make the SEND and RECV descriptors the same, but which would typically be used to specify the maximum length of the message data block and (5) a lock variable. The * next to the lock indicates that this word is written by the kernel; otherwise, the descriptor is specified by the process code, and its contents are only read by the kernel.

After the SEND call, the lock variable becomes FALSE only after the message is completely sent. By "completely sent" it is meant that subsequent writes to the message array do not change the message. Hence the message data may be read while the lock is TRUE, but should not be written.

A message may still be in transit when the lock is made FALSE, and there is no acknowledgment of receipt.

A message sent to a nonexistent process is detected, either in the local kernel if the physical address of the message is out of range, or in the destination kernel, and produces an error message back to the IH.

4.22 RECV Call. The RECV call is very similar to SEND. RECV passes the address of a six-word descriptor block that is in the same format as the SEND descriptor.

```
RECV descriptor_address → sender ID *
                          type
                          start address → msg data
                          length *
                          maximum length (max msg size)
                          lock *
```

The * indicates the words written by the kernel between the time that the RECV is executed and the lock is set FALSE. The words without a * are those that specify the message to be received. The descriptor block includes (0) the ID of the process from which the message was sent, obtained from the message header; (1) the type of the message to be received, which must match that in the message header; (2) the starting address of a contiguous block of memory into which the message is to be written; (3) the actual length of the message, in words, taken from the message header; (4) the maximum length of the message to be received and (5) the lock.

If there was a previously queued message in the kernel message buffer when RECV is called, the oldest such message will be copied into the process space immediately, and the lock will be FALSE on the return from RECV. If there is no such queued message, the lock is set to TRUE in the call, and represents the period during which the receive request is pending in the awaiting arrival table. The first incoming message that matches the type specification will be placed in the proper storage space. The lock becomes FALSE when the message has been written, and the descriptor block then contains the ID of the sender and the actual length of the message received.

A message that is longer than the maximum word count specified will write only the allowed number of words into the message block, but will leave a word count in the descriptor that is larger than the maximum specified.

Only the type is used to match incoming or queued messages against RECV descriptors. Incoming messages cannot be matched by sender ID, nor by maximum length.

14.23 PROBE Call. The PROBE call supports queued communications by the kernel with a system call that allows a process to determine whether a message of a given type has been received. The PROBE call has the format:

```
PROBE descriptor_address → sender ID *
                           type
                           unused
                           length *
                           unused
                           lock *
```

PROBE returns a TRUE if such a message is present, and the sender ID and message length is left in the descriptor. PROBE returns a FALSE if the message is absent.

Just as with RECV, with the possibility of more than one message of the specified type being queued, PROBE returns information about the oldest such message. Thus if PROBE returns with the lock variable FALSE, the next RECV call with the same type (nominally the same descriptor) causes the same message that was probed to be copied into the designated message block. For descriptive purposes, probe may be treated as a special RECV.

4.24 Message Concurrency. The descriptor is laid out in such a way that if repetitive messages of the same type are expected, another RECV can be executed using the same descriptor after the last reference to a previous message. Similarly for SEND and RECV, descriptors are declared at the beginning of a process, and specify "virtual channels" that are used repeatedly by SEND and RECV functions.

Because the kernel modifies the descriptor, concurrently pending SENDs or RECVs should never refer to the same descriptor. As a protection against this error, the kernel first tests in a SEND, RECV, or PROBE call to see whether or not the lock is FALSE. If the LOCK is TRUE, an error in the program has been detected, process execution is suspended, and an error message is sent by the kernel to the IH.

Concurrently pending RECVs may have descriptors whose type specifications are the same. In this case an incoming message will be matched to the RECV that was pending first. In this matched situation, a RECV will be executed with more than one message of that type queued in the kernel message buffer. This situation exemplifies preservation of message order, and the first queued message (from whatever sender) goes into the message block immediately.

4.25 Message Types. A lay visualization of execution of RECV, with its associated descriptor, is to imagine a "type" filter and message buffer for incoming messages. A message whose "type" matches the filter passes through the filter, goes into the buffer, resets the lock and terminates the pending RECV.

The type may be used to filter messages according to any selected criteria. For example, a point process in a grid point computation may need to send and receive messages of several types from neighboring nodes in several directions. If the direction is coded in part of the type, and the distinguished types of messages in another part, one can "filter" these messages readily into different message areas for appropriate action.

The type may also be used to invoke a particular attribute of a process, including the ability of the process to select amongst a number of concurrently invoked attributes.

4.26 Scheduling. The scheduler in the inner kernel runs all processes in a node in a round robin fashion, including the outer kernel processes. The run time for each user process is currently approximately 50 msec, but the invention is not so limited and the time will vary, depending upon the particular processor being employed.

4.27 Auxiliary IK Functions. There are several other functions of the inner kernel that are accessed through system calls:

WHOAMI returns a value that is the process' own ID.

HOWBIG returns a value that is the dimension of the cube in which the program is running.

TIMER returns a real time value, the same for all processes. The 16-bit value is incremented mod $2^{16}$ at approximately 2-msec intervals.

Besides routing messages and scheduling, the inner kernel's other "behind the scenes" activity is storage management. Storage is used both for processes and for the kernel message buffer. Processes are packed into "high" memory and message buffering is placed into "low" memory.

4.28 Program Loading and Running Through the IH. The IH as presently configured has 800 Mbytes of disk memory. Much of the memory is used for the system, compilers, temporary space for checkpoint images and a limited space for user files.

Since the Intel 8086 provides no effective protection mechanisms, the cosmic cube is presently limited to one user at a time, but the invention is not so limited. For example, with a node processor with protection mechanisms, multiple user time-sharing or space-sharing (different user programs in different subcubes) is within today's skill of the art.

Computations are run on the cube by running a program on the IH that, in turn, spawns processes in the cube, and interacts with the cube processes through sending and receiving messages. Since process spawning is accomplished by messages, the entire interaction between the cube processes and IH processes is accomplished by message passing.

Message sending and receiving in this IH process is accomplished through an always-present control program that "owns" the cube, schedules it, and relays messages between the cube and the user IH processes.

4.29 Communication Channels. The communication channels of the cosmic cube are point-to-point and are bidirectional. Sixty-four-bit (4-word) packet queues are located at both the sending and receiving ends of the channel in each direction. Channels are read and written in units of these 64-bit packets. A full input queue ("FIFO") or empty output queue ("FIFO") on each of the six channels (seven on the IH) can be sensed or can cause an interrupt signal. The bidirectional channels are fully independent from each other, and are asynchronous.

The kernel does not use acknowledge messages on the incoming channel for messages going out on the outgoing channel. The only acknowledgement that a packet has been consumed by the node on the other end of a channel is via a recognition protocol that the outgoing queue has space for another packet. This fast and simple operation is defined as a "one trip" protocol.

4.30 Kernel Message Buffer. The kernel message buffer provides a much larger queue for messages, and messages, when received, are stored and maintained in the order of their arrival. Incoming channels may at times be blocked by the message routing algorithm.

With respect to outgoing messages, a message can be extracted from any point in the queue, so long as it is the first (oldest) message with a certain property. The n outgoing channels are provided with the first message that is, according to the routing algorithm, to be sent over that channel, independent of type, length, or other consideration. The messages for processes in the node are extracted from the message buffer based on being the first queued (oldest) message with a given process ID and type.

The queues for each output channel really are queues, with messages inserted on one end and removed on the other. The queue for the node itself may have the oldest message with a given destination process and type removed from any point in the queue, or it may also be regarded as a set of queues, one for each process and message type.

All of the message queues pooled in the kernel message buffer do not have a fixed allocation of space for any particular queues. As long as the buffer can accommodate all of the messages directed to it, the allocation of buffer space is not an issue. However, as soon as messages are blocked by insufficient queue space, the allocation of the kernel message buffer to the different queues becomes an issue.

The space in the kernel message buffer is managed by a list structure that includes also a description and the state of (1) all pending SENDs and RECVs in the node, and (2) messages in progress or blocked at each input and output channel. It should be noted that while an input channel may be blocked by a queued message, the kernel has at least the header of the message that follows.

This above-noted set of list structures are defined as the kernel "message list." The message list contains a complete picture of the message activities in a node, and is the basic information structure for all decisions concerning message flow.

4.31 Message Order. Because message order is preserved for each in/out pair of channels at a node, and because messages between nodes always follow the same path, messages sent in a certain order between pairs of processes are received in the same order.

One should note that this relationship is not maintained beyond pairs of processes. For example, if process A sends sequentially message 1 to A, then message 2 to B, nothing can be said about the order in which they arrive. If C responds to message 2 by sending a message 3 to B, this message 3 may arrive at B before message 1. If B and C are in the same node, message 1 would be first in position in the kernel message buffer.

4.32 Full Buffer Priorities. In order to preserve as much space as possible in its message buffer, the kernel follows a strategy in which it takes advantage of all situations that allow the oldest message of a certain category to be consumed by a process or by an outgoing channel. Activities leading to message consumption are never deferred.

When there is inadequate buffer space for all of the incoming messages that must be placed in the kernel message buffer, the priority in queueing incoming messages is in order from high order to low order channel, followed by messages from processes within the node, in the order of the SEND execution. However, messages from SENDs destined to other nodes do not use queue space, and so are scheduled on the message list to be sent on an output channel as they occur.

Thus, the first effect of congestion is that local SENDs, since they have the lowest priority, will be held pending. The nonlocal SENDs operate as usual; that is, they will be held pending only as long as is required for their turn to come for use of an outgoing channel. Next, the messages on low order channels will be blocked, unless they match a RECV within the node.

When this priority scheme is used together with the e-cube algorithm, any message on the high-order channel (n−1) is necessarily destined for the node; any message on channel (n−2) is either for the node or for a node distance 1 away via channel (n−1), and so on.

This priority is independent of message length. If a given incoming channel is blocked, so are all lower priority channels, except for the possibility of a message arriving that matches a pending RECV, so that it may be passed to the process without using queue space.

4.33 Long Messages. The message descriptor allows messages to be any length up to 32 K words (which is 64 K bytes one segment in the Intel 8086). Obviously, the invention is not so limited. A message that is longer than a certain length (a parameter currently equal to 256 words) is fragmented into shorter messages. The fragments, each message with length greater than 5 and equal to or less than 256 words, are generated and sent in sequence at the source node and are reassembled at the destination node.

As an example, assume that the original message from node A to node B is broken into messages not exceeding 256 words, each with the original message header, and encapsulated in messages that use a reserved destination process ID <i,240>. The first message in such a sequence would look like:

```
<B, 240>   destination = reserved ID
<A, 93>    sender = long mesage sequence number
0          type = offset into message
256        length = length of this fragment
<B, 3>     destination process
<A, 6>     sending process
3          message type
305        message length ------ encapsulated header
...
...        first 252 words of the fragmented message
```

And the second message would look like:

```
<B, 240>   destination = reserved ID
<A, 93>    sender = long mesage sequence number
0          type = offset into message
53         length = length of this fragment
<B, 3>     destination process
<A, 6>     sending process
3          message type
305        message length ------ encapsulated header
...
...        remaining 53 words of the fragmented message
```

The long message sequence number in the sender ID field is generated cyclically by the kernel in the sending node A, by employing successive numbers for each original message that is fragmented. This long message sequence number associates the fragments when they arrive in B, in the event that more than one long message is being sent from A to B concurrently.

With the present routing method of this invention, in which message order is preserved, there is no need for the offset in the type field, nor for the original message header to be repeated; however, this fragmenting scheme is used to afford additional flexibility and to be compatible with concurrent computers which employ routing methods that do not preserve message order.

There are two basic reasons for fragmenting long messages.

The first reason is that, otherwise, one could not send a message from node to node unless there was sufficient storage space for that message in every intervening node. This would create an unnecessarily wasteful time requirement.

The second reason for fragmenting long messages is to bound the maximal message length. The kernel message buffer always retains sufficient free space to accommodate the n longest messages that may be blocking each input channel.

This difference in protocol for short and long messages, together with the exact value of the parameter that distinguishes them, is, of course, subject to variation, and such variations are well within the scope of this invention.

SUMMARY OF THE INVENTION

A concurrent computing method and system is disclosed wherein the concurrent computers ("nodes") form a concurrent computing system which uses the novel steps of (a) asynchronously connecting a binary n-dimension cube in which N nodes are linked by point-to-point, message-passing, bidirectional communication channels; (b) computing by processes which include sending and receiving messages between nodes; (c) asynchronously and bidirectionally controlling message passing between nodes; and (d) assuring orderly and eventual consumption and movement of all messages between the sending and receiving ends of every node's bidirectional channel.

Each node is connected to bidirectional channels and employs "one trip" protocols. In a "one trip" protocol, each node has a sending-end and a receiving-end queue for each communication channel to which it is connected. A given size packet is located in queues at both the sending and receiving ends of all channels associated with a given node. Channels are read and written in units of these bounded information packets. The only acknowledgement that indicates that such an information packet has been consumed by a node on the other end of a channel is that the outgoing queue has space for another packet. Thus, acknowledge messages are not placed on the incoming channel for messages going out on the outgoing channel. This one trip protocol is efficient, simple, and saves considerable time in computer system operation.

BRIEF DESCRIPTION OF THE DRAWINGS

FIG. 1 comprising

DETAILED DESCRIPTION OF THE DRAWINGS

Figure 1A:
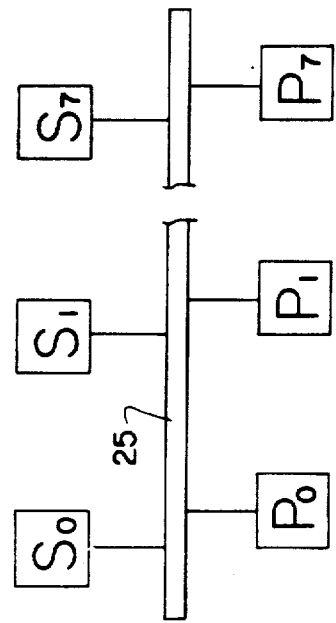
FIGS. 1A and 1B, are prior art concurrent multiprocessor systems structured respectively with a switching network and a common bus.

Two typical examples of prior art concurrent processing systems are depicted in FIG. 1. FIG. 1A includes a series of processors 10 labeled $P_0$ through $P_7$. Typically those processors 10 are connected through a switching network 15 to associated memory storage devices 20 labeled $S_0$ through $S_7$.

Figure 1B:
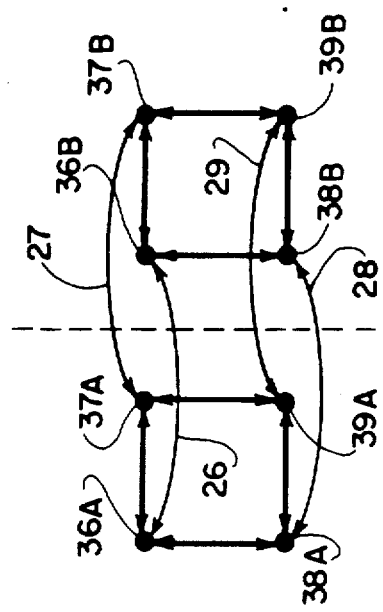

FIG. 1B shows the same terminology used for FIG. 1A except that a common bus 25 is shown as shared by the processors and memory storage units.

Figure 2:
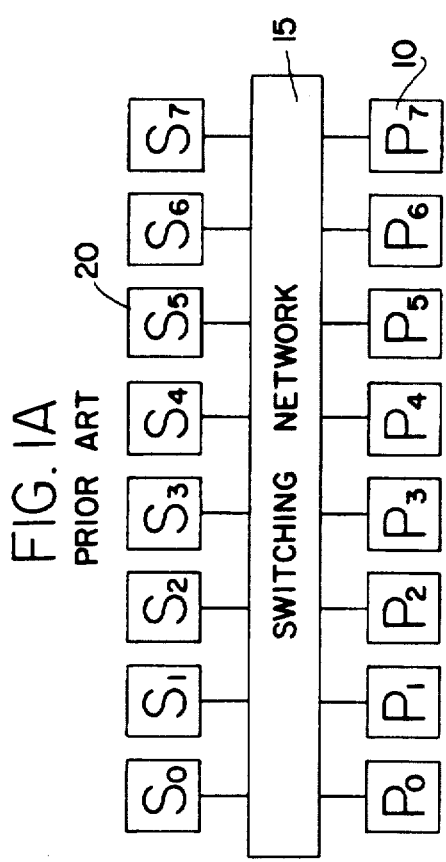
FIG. 2 is a highly simplified prior art n-cube (n=3) which may advantageously be employed in the message-passing concurrent multiprocessor of this invention.

FIG. 2 depicts four bidirectional channels 26, 27, 28 and 29 which provide communication links for four node pairs 36A, 36B; 37A, 37B; 38A, 38B and 39A, 39B. Each node has its own processor and memory storage. Note that although similar numbers are used for node pairs A and B, each node can communicate with three neighboring nodes and vice versa. Thus 36A has as its neighbors node 37A, node 38A and node 36B.

Figure 3:
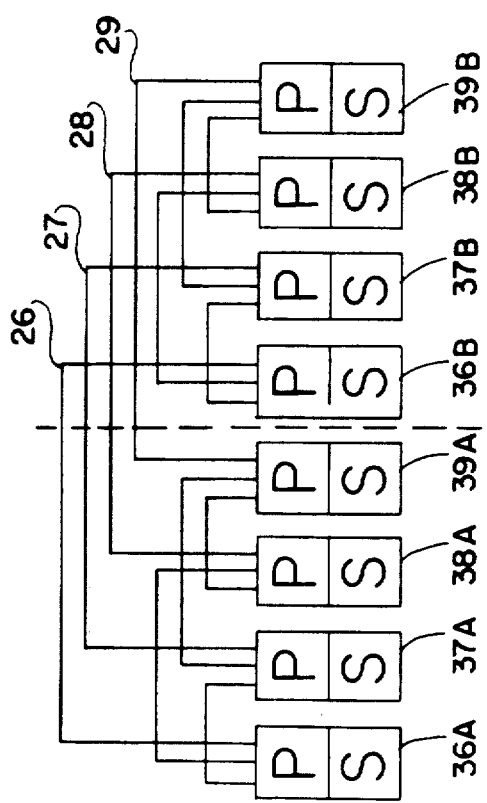
FIG. 3 is a simplified redrawing of FIG. 2.

FIG. 3 does not show the processor and storage in block form, but, rather, depicts the nodes simply as dots. Thus, FIG. 3 is the same as FIG. 2, but, it is drawn in a slightly different manner. Each square in FIG. 3 is a 2-cube or four nodes. Presenting the node as dots allows the corresponding corners of each square to be connected by a bidirectional communication link to a neighbor square to form a 3-cube or a three-dimensional cube.

For simplicity of presentation of the basic background operation, the IH is not shown for FIGS. 2 or 3. These figures present the connection for micro processors to each other by lines that should be understood as bidirectional communication links.

Figure 4:
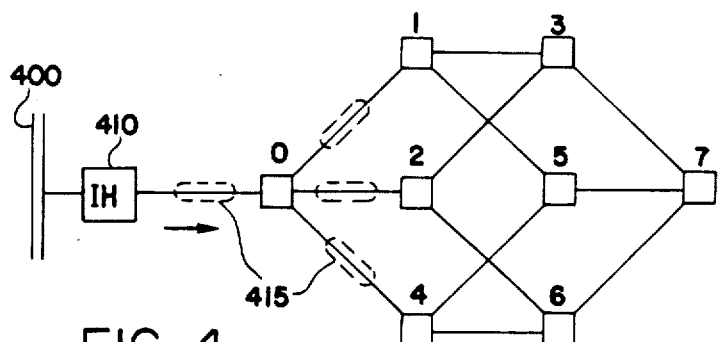
FIG. 4 depicts a highly simplified 3-cube schematic connected to an IH computer.

FIG. 4 depicts an IH connected to a 3-cube system. Messages are broadcast on a contention network 400, such as the Ethernet, or on a bus by a sending processor (not shown) to the entire multiprocessor system. The use of an IH is known in the prior art, and per se is not the invention.

The nodes of FIG. 4, shown simply as squares, are each multiprocessors assigned numbers $N_0$ through $N_7$. Each node or receiving processor can pick up a message on a one-to-one basis. Before describing the message passing system, however, the role of the IH 410 is described.

IH 410 sends out startup packets of information shown symbolically as dashed rectangles 415 (see Definitions 4.27 and 4.28 of Section 4). The IH is connected to node $N_0$. These packets 415 permit each of the nodes to discover its own identity. (See WHOAMI, Definition 4.27.) Note that the auxiliary inner kernel functions of Definition 4.27 provide basic system calls to accomplish, for example, the identity of the nodes. Concurrently, all the asynchronous bidirectional communication channels between the individual nodes are checked to see that they are all operational. The initialization of the 3-cube system involves a message that traverses the "corner" node $N_0$ to node $N_7$ and then from node $N_7$ back to node $N_0$. If node $N_3$, for example, did not respond to messages, the nodes $N_1$, $N_2$ and $N_7$ to which node $N_3$ is connected detect this fact. Nodes $N_1$, $N_2$ and $N_7$ report this failure back to the corner node $N_0$ over communication channels other than those involving node $N_3$.

Each processor has one bidirectional channel to communicate with each of its neighboring processors. In order to send a message to a distant processor, the sending processor first sends the message to its neighboring processor, and the neighboring processor, in turn, sends it to the next neighboring processor. For example, in FIG. 4 assume that a message is to be sent from node $N_0$ to node $N_7$. The message may go over several paths, from node $N_0$ to node $N_1$ and from node $N_1$ to node $N_3$ and on to node $N_7$. The process continues until the message is received by the destination processor, node $N_7$. This method calls for a routing algorithm for sending messages in order to achieve high efficiency and to avoid deadlocks.

In this invention, messages are routed by the e-cube algorithm, defined as follows: A message in node x has a destination in node y. Compute XOR(x,y). If the result is 0, then the message is at its destination node, if otherwise, send the message on the channel corresponding to the lowest-order (rightmost) 1 in XOR(x,y).

For example, a message from node 000001 (in binary) to node 010110 (in binary) would be routed starting with low-order channels from 000001 to 000000 to 000010 to 000110 to 010110. A return message follows a different route, from 010110 to 010111 to 010101 to 010001 to 000001.

Figure 5:
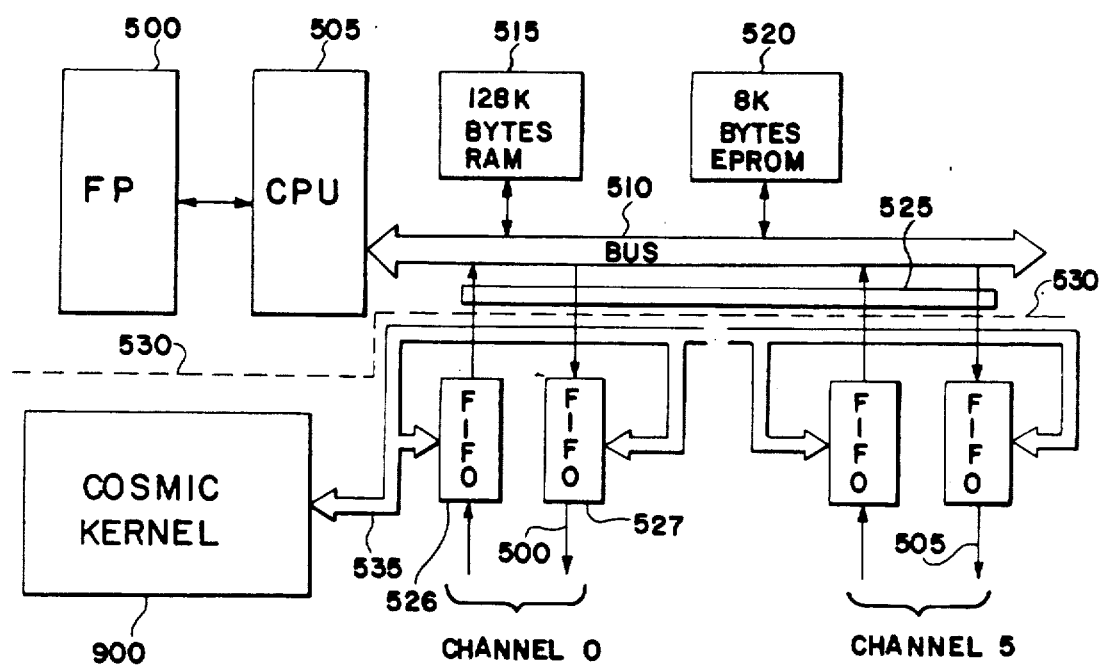
FIG. 5 is a simplified block diagram of a node processor.

Messages are routed on a FIFO basis. FIG. 5 depicts the functional blocks of a node. The micro processor of FIG. 5 is shown having an Intel 8087 floating point numerical processing unit 500 and an Intel 8086 central processor unit 505 connected to an Intel 8086 bus 510 as is typical of such microprocessors. The random access memory 515 stores 128 K bytes plus parity, while an erasable programmable read-only memory (EPROM) 520 has storage capacity of 8 K bytes.

Above dashed line 530, FIG. 5, is an Intel 8259A programmable interrupt controller chip 525. The chip 525 is normally used, in accordance with standard Intel operation, to input and output data. In FIG. 5, the dashed line 530 depicts the point of demarcation between common microprocessor organization and the organization for the method and structure of this invention. In this invention, the Intel 8086 bus is connected to six bidirectional communication channels for message passing purposes. Data, however, is now input and received over twelve unidirectional communication channels which are used in this invention.

Below dashed line 530 in FIG. 5, what should be noticed immediately (as distinguished from conventional microprocessor operation) is that there is no conventional input/output interface interacting with terminal ports, disk drives, etc. Instead, the nodes employ FIFOs for a message-based architecture. The six communication channels are 500, 501, 502, 503, 504 and 505. Such FIFO devices are well known and are available today in chip form. A suitable FIFO is fully described in a thesis on file with the assignee entitled "A FIFO Buffering Transceiver: A Communication Chip Set for Multiprocessor Systems" by Charles H. Ng 5055:Tr:82 ("Ng thesis"). The FIFO devices, as shown symbolically by the double-headed arrows 535, are under control of the cosmic cube kernel 900 shown in block diagram in FIG. 5. This kernel 900 and its control with the FIFO and the input/output data interface are described in greater detail hereinafter in connection with the description of FIGS. 6, 7, 8 and 9.

Figure 6:
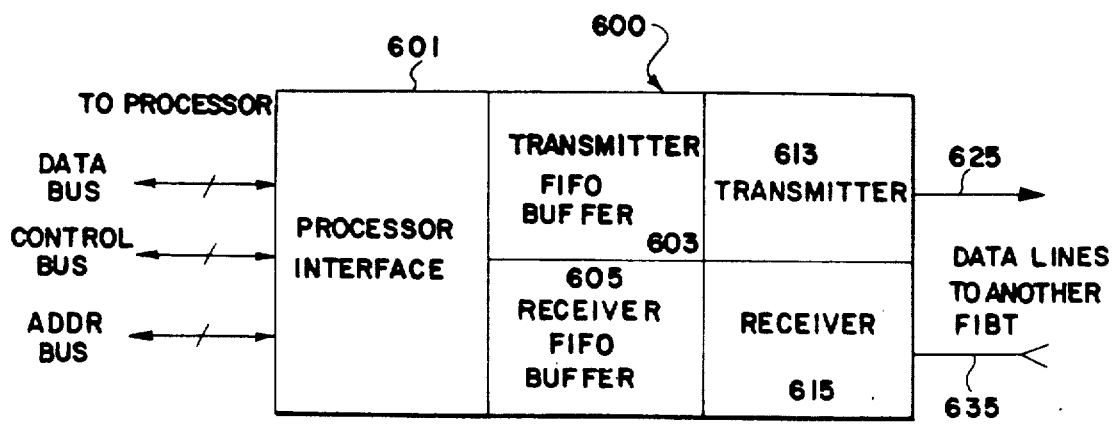
FIG. 6 depicts a simplified block diagram of a prior art first-in-first-out (FIFO) buffering transceiver (FISB)

FIG. 6 in this patent application closely parallels FIGS. 1 and 2 of the Ng thesis. Since such devices are well known, only a brief background description is warranted. In FIG. 6, a FIFO buffering transceiver (FIBT) of the Ng thesis is depicted.

Every node has a FIFO buffering transceiver (FIBT) 600. The FIBT 600 is divided into five major functional blocks. As shown in FIG. 6, the functional blocks include: (1) processor-interfacing circuit 601, (2) transmitter FIFO buffer 603, (3) transmitter 613, (4) receiver 615 and (5) receiver FIFO buffer 605.

Interprocessor communication is done by passing messages. A message is comprised of a number of packets. Each packet has L words; each word has W bits. The variables L and W are used to generally designate the packet size. The Definition section of this application fully describes the packet and its makeup. Briefly, however, the FIBT 600 is designed to pass data in a complete data packet in order to reduce the time lost in conventional "handshaking."

Assume that the FIBT 600, FIG. 6, is ready to accept a data packet, either from the IH processor 410 or another FIBT. It will do so only if there is enough room inside the FIBT to store a complete packet. Similarly, if the FIBT has data ready for the processor, the data must be in a complete packet. The IH processor is expected to send out (or receive) a whole packet of data to (from) the FIBT.

Between any two FIBTs, two serial data lines 625, 635, FIG. 6, are used for communication. When the FIBT 600 is transmitting data, it takes in words of data from the processor via the processor inter facing circuit 601, pushes the data into the transmitter buffer 603, passes them to the transmitter 613, which then links up the data bits, and drives them out serially over data line 625.

When the FIBT 600 is receiving data bits from another FIBT, the receiver 615 accepts the data bits, links them up, pushes them into the FIFO receiving buffer 605, and passes them to the processor via processor interface circuit 601. On the processor interfacing side, FIG. 6, the FIBT uses a parallel data bus (see data bus 510 in FIG. 5), a control bus and an address bus to interface with the processor, whether that processor is in another node or in the IH.

Figure 7:
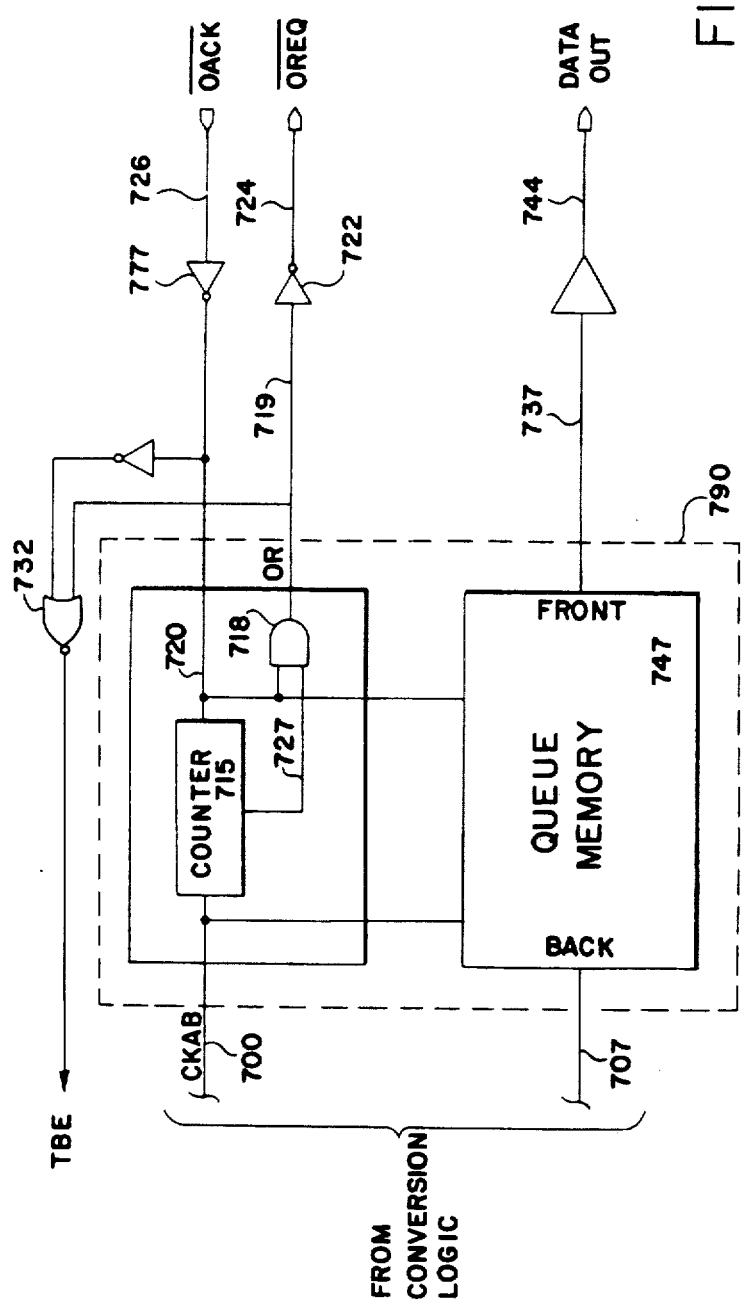
FIG. 7 is a block diagram depicting the FIFO logic for a transmit protocol.

FIG. 7 depicts the logic and connections for a FIFO operation employing the transmit protocol of this invention. Since the components employed in the preferred embodiment are limited to 4-bit-wide transfers on both loading and unloading, conversion logic is required at the processor interface. The 16-bit words of the Intel microprocessor are converted into four 4-bit "nibbles" that are clocked into FIFO 790 via lead 700, which is the input clock line, and lead 707, which is the nibble wide input data path.

After sixteen nibbles have been loaded into queue memory circuit 747, the queue memory will be full. Counter circuit 715 keeps track of the number of nibbles clocked in, and it will signal via lead 727 that the queue memory is full and is ready to transmit the stored packet. Assuming that the output acknowledge, lead 726 ($\overline{OACK}$) is initially low, both inputs to AND gate 718 will be true. Output ready, lead 719, from AND gate 718 will then go high. This high signal is buffered by inverter 722, and produces a signal on lead 724, which is the output request signal ($\overline{OREQ}$) to the complementing receiving FIFO.

A receiving FIFO will accept data from the front of the queue memory on lead 744 and will raise its output acknowledge lead as a signal that it has accepted a nibble. The inverter 777 inverts this signal, and lead 720 goes low. This condition, in turn, makes the output of gate 718 go low and consequently, lead 724 goes high. When lead 724 goes high, it signals the receiver that it "knows" that the receiver has accepted the nibble. The receiver, in turn, must lower lead 726 to signal to the transmitter that it "knows" that the receiver "knows" the nibble has been accepted. After lead 726 goes low, the output (lead 720) of the inverter 777 will go high, which will both clock the counter 715 and the queue memory 747 from the unload side. Clocking the queue memory from lead 720 will advance all nibbles one slot forward and will discard the one previously at the front.

At this point, if the queue memory 747 is not empty, then the counter 715 will still hold lead 727 high. With lead 720 high, lead 724 will again go low, indicating that the next nibble is ready to be accepted by the receiver. The above process is now repeated and will continue to be repeated until the queue memory 747 is empty. At this time, lead 727 will go low and lead 719 will be inhibited from going high. The condition of both leads 719 and 726 low, that is, output is not ready and there is output acknowledge, will make the output of NOR gate 732 go high, notifying the Intel microprocessor that the queue memory is now empty and can be reloaded by the conversion logic through lead 707.

Figure 7A:
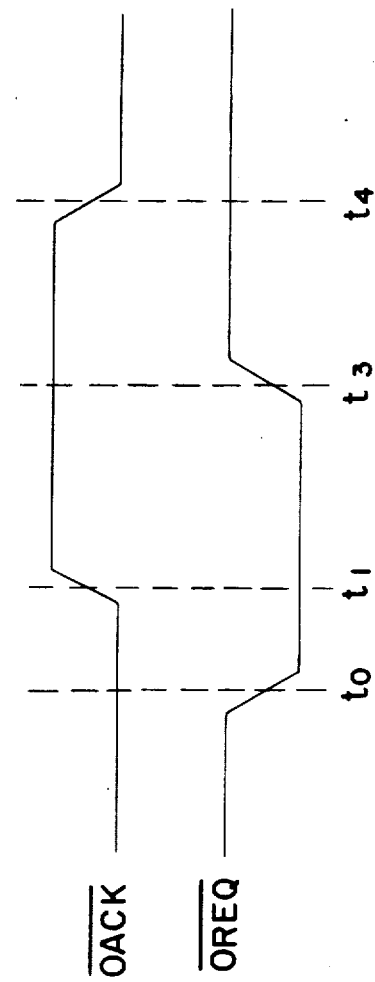
FIG. 7A is a waveform useful in understanding the self-timed request/acknowledge communication channel operation of this invention.

The timing diagram for the nibble transfer described above is shown in FIG. 7A. Initially output request is high and output acknowledge low. At time $t_0$, the transmitter signals the receiver that the nibble at the front of the queue memory is ready to be accepted. At time $t_1$ the receiver has acknowledged to the transmitter that it has received the nibble. At time $t_2$ the transmitter signals the receiver that it "knows" the nibble has been accepted. Finally, at time $t_3$, the receiver signals the transmitter that it "knows" that the transmitter "knows" the nibble has been accepted. Time $t_4$ marks the start of another nibble transfer. After 16 intervals between $t_0$ and $t_3$ have been completed, a complete packet has been transferred.

An important feature of this protocol may be appreciated by imagining that one of the control leads, i.e., signal 724 or 726, has been broken. If this were to happen, the transmitter would desist from further transmission until the broken signal was properly re-established, at which time the transfer would continue as if the wire had never been broken. This feature of self-timed request/acknowledge protocol is employed in this invention. Its asynchronous nature is readily apparent, since there is no master clock timing source compelling the transmitter to send data when the receiver does not properly respond.

Figure 8:
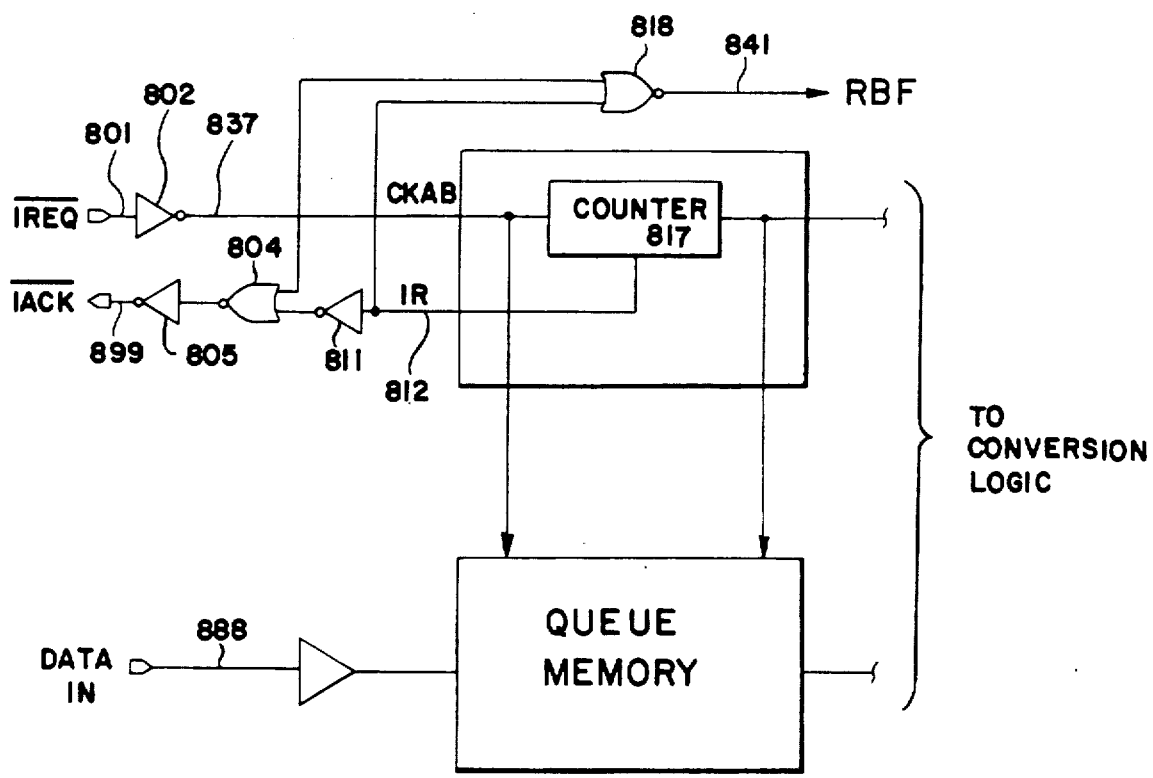
FIG. 8 is a block diagram depicting the FIFO logic for a receive protocol.

The receiver FIFO, FIG. 8, behaves in a fashion complementary to that of the transmitter and will only be described briefly. For one skilled in the art, the design of such a receiver would immediately unfold itself once the transmitter has been understood. Referring to FIG. 8, input request (lead 801) is initially high. This is readily seen by referring back to the description of how the transmitter works and noting that that input request is connected to output request (lead 724) of FIG. 7. Providing that the queue memory 847 is initially empty, lead 812, the input ready signal will be high, indicating that the receive FIFO is ready to receive nibbles from the transmitter. Both input request and input ready are inverted by inverters 802 and 811, respectively. The two signals are then inputs to NOR gate 804, which gate, together with inverter 805, forms an OR gate, whose output is an input acknowledge signal on lead 899. This lead, in turn, is hooked up to output acknowledge lead 726 of FIG. 7. Note that since input request is high and input ready is high, then the lead 899 will be low, thus satisfying the requirement that lead 726 of FIG. 7 be initially low.

When input request goes low, lead 837 will go high, which will cause three things to occur. First, the counter 817 will be incremented. Second, the queue memory will advance all nibbles one slot, accepting the nibble from lead 888 as the last word in the queue memory. Thirdly, the output NOR gate 804 will go low, which will, in turn, cause input acknowledge, lead 899, to go high, thus acknowledging that the packet has been accepted. When the transmitter detects the acknowledge, it will raise input request, which will, in turn, cause lead 899 to go low again. The reception of another packet may now be started, following the four-cycle handshake protocol of FIG. 7A. When sixteen such handshakes have transpired, the counter will set input ready low (lead 802), thus forcing lead 899 to remain high and preventing the conclusion of the last $t_4$ transition. Since the transmitter has not removed its request and is waiting for the receiver to comply, lead 837 is low and lead 802, input ready, is low, both inputs to NOR gate 818 will be low, and thus the output of NOR gate 818, lead 841, i.e., the receiver buffer full signal to the Intel microprocessor, will go high. When the Intel microprocessor detects this signal being high, it will unload the 16 nibbles via lead 842 into the conversion logic, which will convert the 16 nibbles into four 16-bit words.

Figure 9:
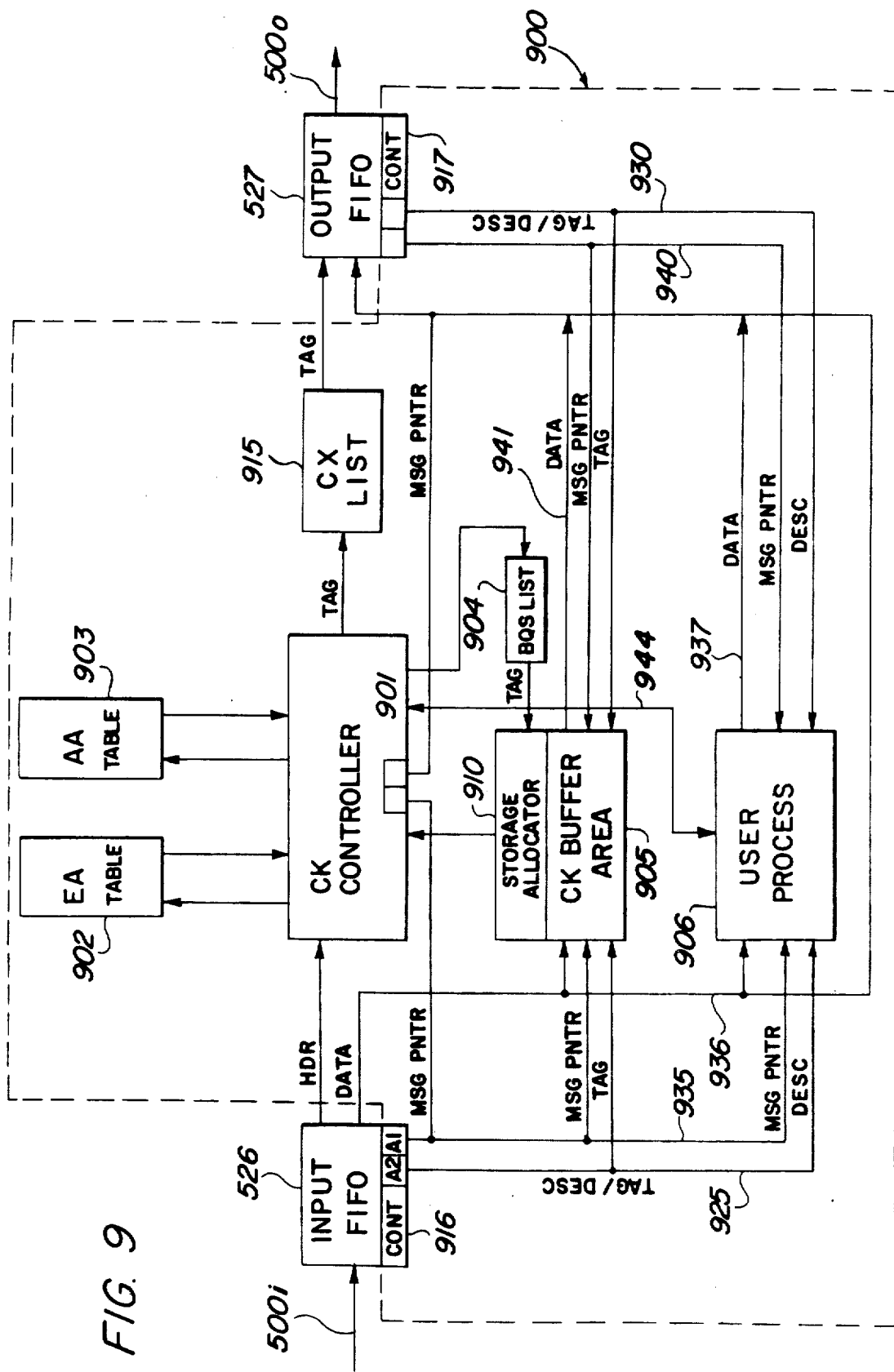
FIG. 9 is a more detailed block diagram depicting the, message-passing operation of a cosmic cube according to this invention.

With the basic system operation now described, this invention, including a transmit and a receive operation involving input and output FIFO queues, may now be described by reference to FIG. 9. The operation of FIG. 9 is generalized and basic. The general description includes many of the functions described in the definition section for this invention.

For simplicity of understanding, only one input channel, $500_i$, and one output channel, $500_o$, are depicted in FIG. 9. These channels, for example, correspond to the two channels depicted as channel pair 500 in FIG. 5. Accordingly, every input (only $500_i$ shown) and output (only $500_o$ shown) is a six-lead communication channel, as has been described earlier in conjunction with FIGS. 7, 7A and 8.

Associated with the control leads and functional block diagrams of FIG. 9 are terms that have been described in the definition section for this invention. Within the dashed circuit 900 is a cosmic kernel controller 901. Associated with controller 901 is an Early Arrival (E.A.) table 902, an Awaiting Arrival (A.A.) table 903, and a "blocked for queue space" list ("BQS") 904. The controller 901 can use either the message descriptors of the user process or its own shortened version of those descriptors, which is called a "tag." For clarification, the access to user process memory space is done only by message descriptors, and access into buffer area 905 is done only by tags.

A cosmic kernel buffer area 905 is the main storage area for the node. Associated with buffer area 905 is a separate storage allocator 910 for the buffer memory 905. The allocator 910 is used for storage management of area 905. Various "tags" and/or "descriptors" are utilized and will become clear when the flowcharts of FIGS. 10 through 16 are described in detail in conjunction with FIG. 9.

Connected between the tag output of controller 901 and the output FIFO 527 is a "channel transmit list" memory ("CX") 915. Associated with input FIFO 526 is a FIFO control 916, and associated with output FIFO 527 is a FIFO control block 917. Both FIFO control blocks 916 and 917 control the function of counting, as shown by the count legend. Both FIFO controls also supply a message pointer ("MSG PNTR") and a tag/-descriptor ("TAG/DESC") as shown by the legends. Before describing the operation of FIG. 9, certain of the control leads must be identified so that the flowchart and operational descriptions may more easily be followed.

From input FIFO control 916 a TAG/DESC is supplied by lead 925 to user process 906. Similarly, output FIFO control 917 supplies a TAG/DESC via lead 930 to the user process 906. FIFO controllers 916 and 917, respectively, supply MSG PNTR signals to user process 906 via leads 935 and 940. As depicted by leads 936, data may, under appropriate circumstances, be accepted from input FIFO 526 by user process 906. Data also may be sent, under appropriate circumstances, from user process 906 to output channel 500 via lead 937 and output FIFO 527. Data movement is shown by the appropriate legends in FIG. 9.

Before describing the general operation of message passing and computation for a node, as exemplified by the block diagram of FIG. 9, a brief discussion of the general approach for a SEND is deemed helpful.

Figure 10A:
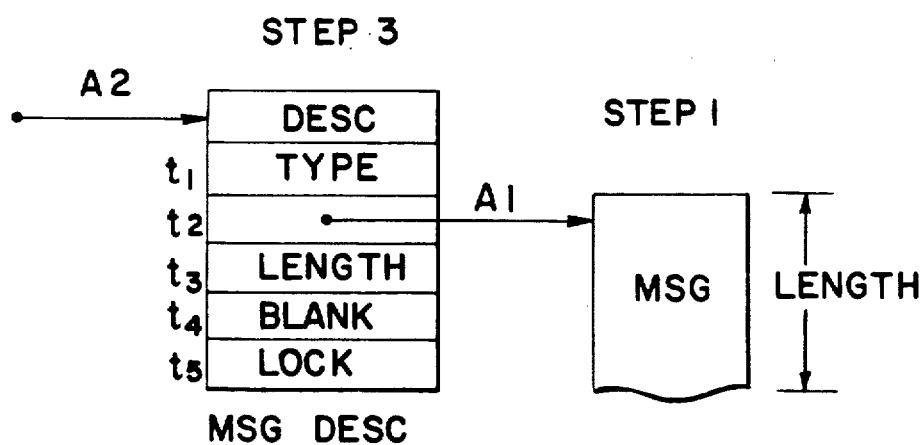
FIG. 10A is a visual aid to ease an understanding of the message format of this invention.
Figure 10:
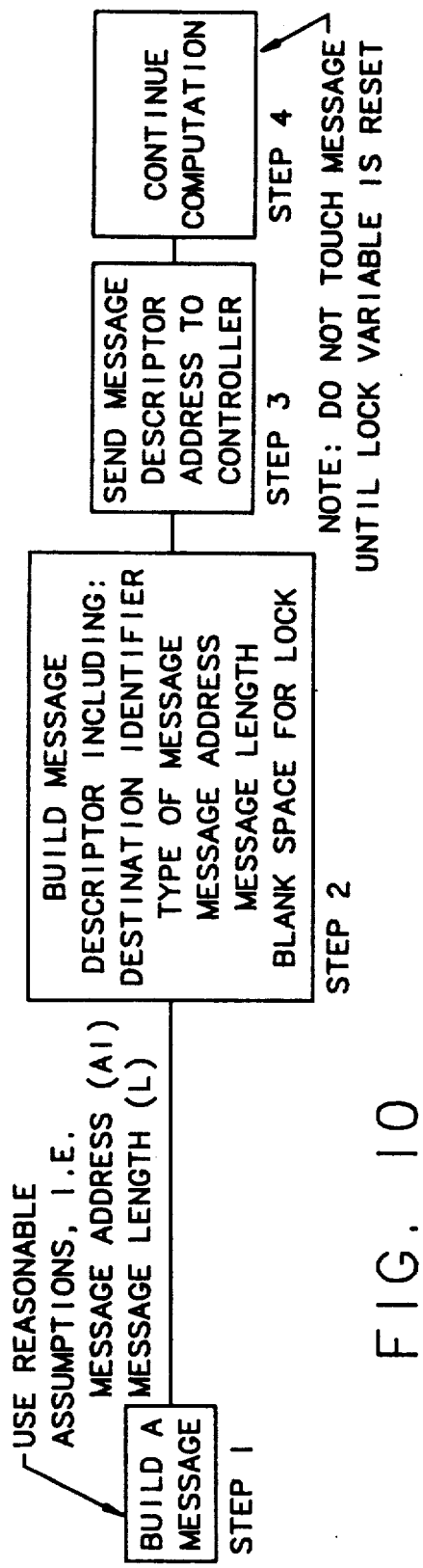
FIG. 10 is a flowchart depicting a typical sequence for a user process to do a SEND.
Figure 11:
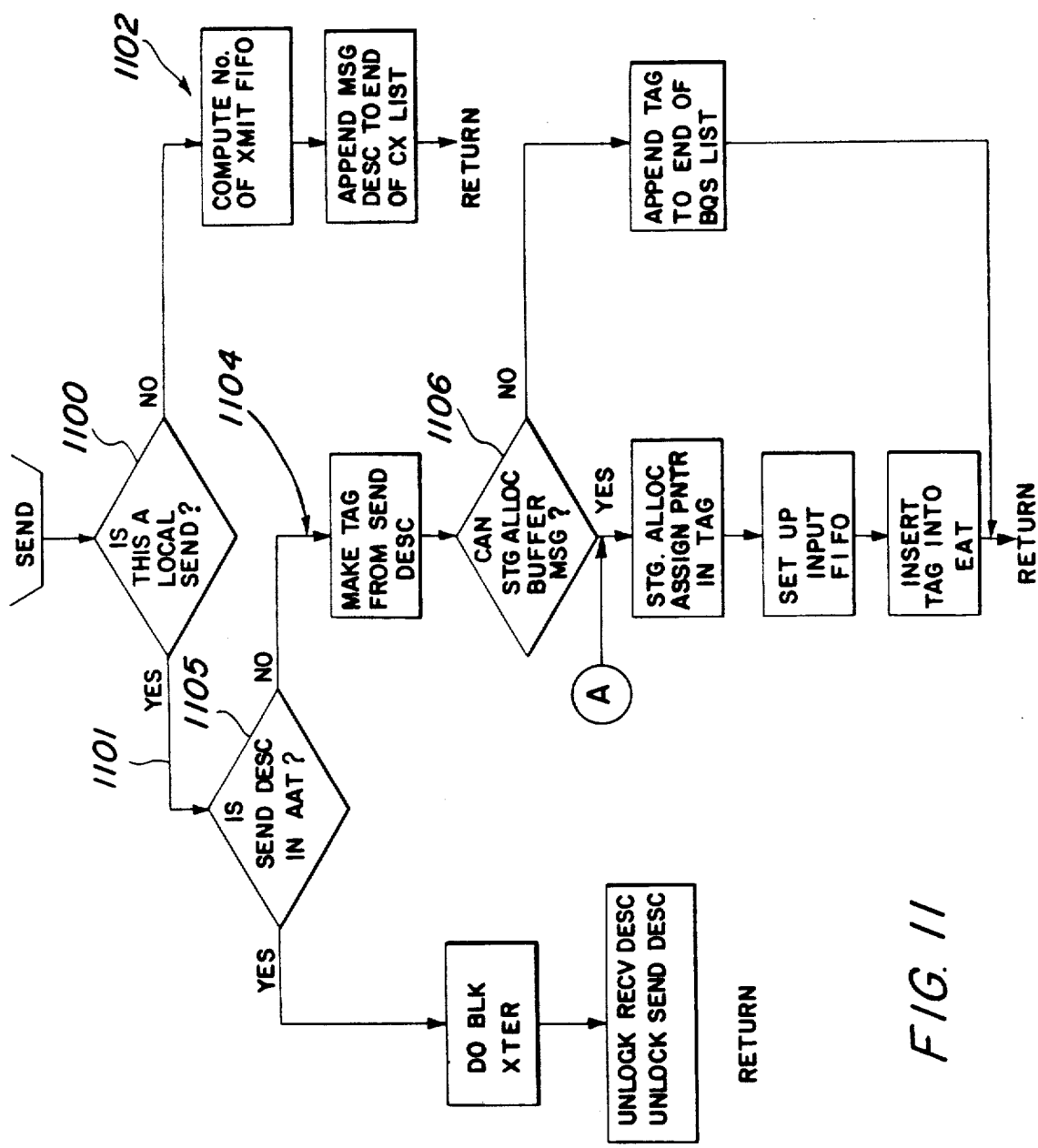
FIG. 11 is a flowchart depicting a SEND call.

The simplest way to understand the operation of one salient feature of this invention is to briefly review the underlying philosophy of a SEND as depicted by FIGS. 10, 10A and 11. Take, as an example, that two processes are involved and that they both reside in the same node. One process is going to send a message to the other process. The cosmic kernel will take the message from the sender's address space and put it directly into the receiver's space. Note with respect to Step 4 of FIG. 12, however, that only a maximum length was reserved in the receive buffer. It is thus necessary for the cosmic kernel to set the actual length of the received message.

Because the cosmic kernel has control over all of the processes it controls the setting and resetting of the locks for SEND and RECV descriptors. The kernel also monitors what is being done. Thus, as soon as a SEND action has been completed, the kernel will reset the lock because that reset condition indicates that the message has been sent.

Assume at this point that two processes are trying to send out over the same channel. For example, one instance is shown in FIG. 9. Since there are many processes, two processes may be competing for a SEND over channel $500_o$. A priority system is established for the node so that only one process will gain access to that particular channel. The channel transmit list, CXL 915, queues up the message descriptor addresses of the transmitting processes. Note branch 1102 of FIG. 11, which shows the particular instance wherein a message is queued at the end of the CXL (915).

Now assume that a process with a current SEND descriptor has gained access to the output channel $500_o$. The detailed operation of transmitting from the output FIFO 527 has been described earlier. Suffice it at this point to note that a transmit buffer interrupt will cause the kernel to examine the current SEND descriptor and look at the message address. The next four words go into the output FIFO hardware, as was described in connection with transmit protocol of FIG. 7. During that storing process, computation is continuing in the node until another interrupt is received. After the current four words have been sent, another interrupt may occur. If the message that has been pointed to by the SEND descriptor has been fully transmitted, the kernel will reset the lock and remove the current descriptor from the front of the channel transmit list CXL (915).

In summary then, the user process fills the channel transmit list with messages from one end, and the cosmic kernel, using FIFO priority, empties the messages out as fast as possible.

FIG. 10 shows the necessary steps in a sequence for the user process 906, FIG. 9, to perform a SEND. These steps can be done manually by a programmer, or automatically, for example, by a compiler preprocessor, or a compiler itself. Step 1 indicates that a message will be formulated using reasonable assumptions which are known. More explicitly, the user process will know both where the message is located (A1) and the length (L) of the message. Step 2 requires that a message descriptor be built. Certain words in the descriptor can be filled in immediately, while other words are left blank.

FIG. 10A is a diagram to help visualize the steps of FIG. 10. For example, Step 1 is to build a message (MSG 1000). Such a message, of length "L," is generally depicted in FIG. 10A and indicating the address (A1) 1005 where the message is located. The message may be located in any contiguous memory space sufficient to hold the message. The user process assigns that location as the location from which the message is to be sent. The "LENGTH" is the actual length of the message.

Step 2 of FIG. 10 is also depicted in diagram form in FIG. 10A. Step 2 includes an arrow (A1) which points to the actual address (A1) of the message. The rest of the content of Step 2 is self-explanatory from FIG. 10 and from Definition 4.18.

According to Definition 4.18, for example, the lock variable may either be a 0 or a +1, which, respectively, are false and true. In its untouched state for a SEND, the lock variable is true or +1 as long as the requested operation is still pending. As long as the lock is in a true state the message may be read, but must not be written or moved anywhere in the system. It will become clear in connection with the description of FIG. 11 that an execution of a SEND will be incomplete, i.e., it will be in a pending and unexecuted state until the lock variable has been set to false. The lock variable will be set to false by the cosmic kernel system hardware.

The SEND operation is depicted in flowchart form in FIG. 11. The first step that occurs is that a decision must be made at decision block 1100 whether or not the SEND is for the local node or for some remotely located node. Based upon the results of that decision step, branches 1101 or 1102 will be followed.

In order for the decision in block 1100 to be made, the system call of a SEND is first indicated by an interrupt from user process 906 to controller 901 over lead 944. The content of the interrupt is the address of the message descriptor, e.g., A2 of FIG. 10A.

Step 3, FIG. 10 requires that the address to the message descriptor be sent to the cosmic kernel 901, FIG. 9. The descriptor address is nothing more than a pointer to the descriptor, whereas the descriptor, in turn, points to message data. The signals representative of the information of Steps 1 and 2 are sent to controller 901 from user process 906 over lead 944. The double-headed leads in FIG. 9 indicate that such signals are readily available in both directions. Whether the signals are binary, serial, parallel, etc., obviously depends upon the microprocessor configuration that is being employed. It thus must be understood that the leads and circuitry formed in FIG. 9 are configured in a well-known manner to handle the particular data format that is used by the microprocessor for all nodes in the cosmic cube invention. In the preferred embodiment 944 is realized as a 16-bit register of the Intel microprocessor 8086.

In Step 4 of FIG. 10, it is noted that the message that has been built is not to be "touched" by the user processor 906 until the lock variable is reset. Turning now to FIGS. 9 and 11, certain of the hardware and software operations involved in executing a SEND may be understood.

As explained earlier, and as defined by Definitions 4.4 and 4.5, the cosmic kernel 900, FIG. 9, manages the process structure and additionally handles the messages being sent between any given process and another process, whether those two process are in the same or some other physical node. In its management role, the kernel 900, FIG. 9, first reads the destination identifier, which is the first word, word 0, of the message descriptor. That word is decoded, and the kernel will, via its processor, compute whether the word is for a local or some other, remote node. (Assume that decision block 1100, FIG. 11, decided NO, that it is not a local SEND. In that event, branch 1102 must be followed ) At this point in the system operation, the kernel 900 is in the message-handling mode. Kernel 900 will start negotiating for a transfer of the message to the destination node if needed. The word "negotiation" is employed because it may be that the kernel cannot service the SEND request immediately. In essence, what is happening in the system operation is that the kernel promises to do the SEND but it does not promise when it will be done. For example, the kernel may completely read the entire message into its own buffer (such as buffer area 905 a software storage area associated with user process 906) until the message can be sent out.

The kernel processor 901, as long as the lock variable is in a set or true condition, communicates to the user process 906 that the message has not yet been transmitted. This must be interpreted by the user, that should the user alter that particular message in any way, the integrity of the message is in jeopardy.

For the steps of branch 1102, FIG. 11, the first step done by the kernel 900, FIG. 9 is to compute the number of the transmitting FIFO, such as, for example, output FIFO 527. This computation is based on the first word, or destination identifier, of the message descriptor using the e-cube algorithm. Having computed the output FIFO number, the message descriptor is appended to the channel transmit list (see CX list 915, FIG. 9) for that FIFO channel. This channel transmit list must be accessed in FIFO fashion in order to preserve message order as defined in Definition 4.31 of Section 4. The system then returns so that another request can be serviced.

Assuming that decision block 1100 has made a YES decision via processor 900, FIG. 4, then branch 1101 is followed. The first step that takes place is shown by decision block 1105 where the kernel 900, FIG. 9, must review the SEND descriptor to see whether or not the identity of the receiving process has been stored in the awaiting arrival table 903, FIG. 9. If "NO" at the output of decision block 1105, then branch 1104 is followed. The user process makes a tag from the SEND descriptor. Thereafter, the kernel must consult the storage allocator 910 in the kernel's buffer area 905. If the storage allocator 910, FIG. 9, determines that there is sufficient space to buffer the message, a "YES" decision will be made at decision block 1106. Storage allocator 910 will assign a pointer and that pointer will be formulated as part of the tag. When that pointer has been assigned to a space in the buffer area 905, a block transfer of data from the input FIFO 526 via lead 940 is stored in the kernel's buffer area 905, and then returns so that it can service another request.

If decision block 1106 determines a "NO" answer, then only one step takes place prior to return. As shown in FIG. 11, the tag is appended at the end or the last one in the BQS list. When that tag is placed in the list, the processor 900 cannot accept the data and the SEND is left uncompleted until enough space becomes available. Reference should be made to Definition 4.18 at this point if more detail is required.

Branch 1101 is the node action when a local SEND has been detected. A "YES" output at decision block 1105 accomplishes a block transfer of data. Data and block transfer have been defined earlier. Once the data transfer has taken place via lead 936 to lead 937 using message pointers on leads 935 and 940, respectively, then the last step prior to return is to reset or "unlock" both the SEND and the RECV descriptors.

Figure 12:
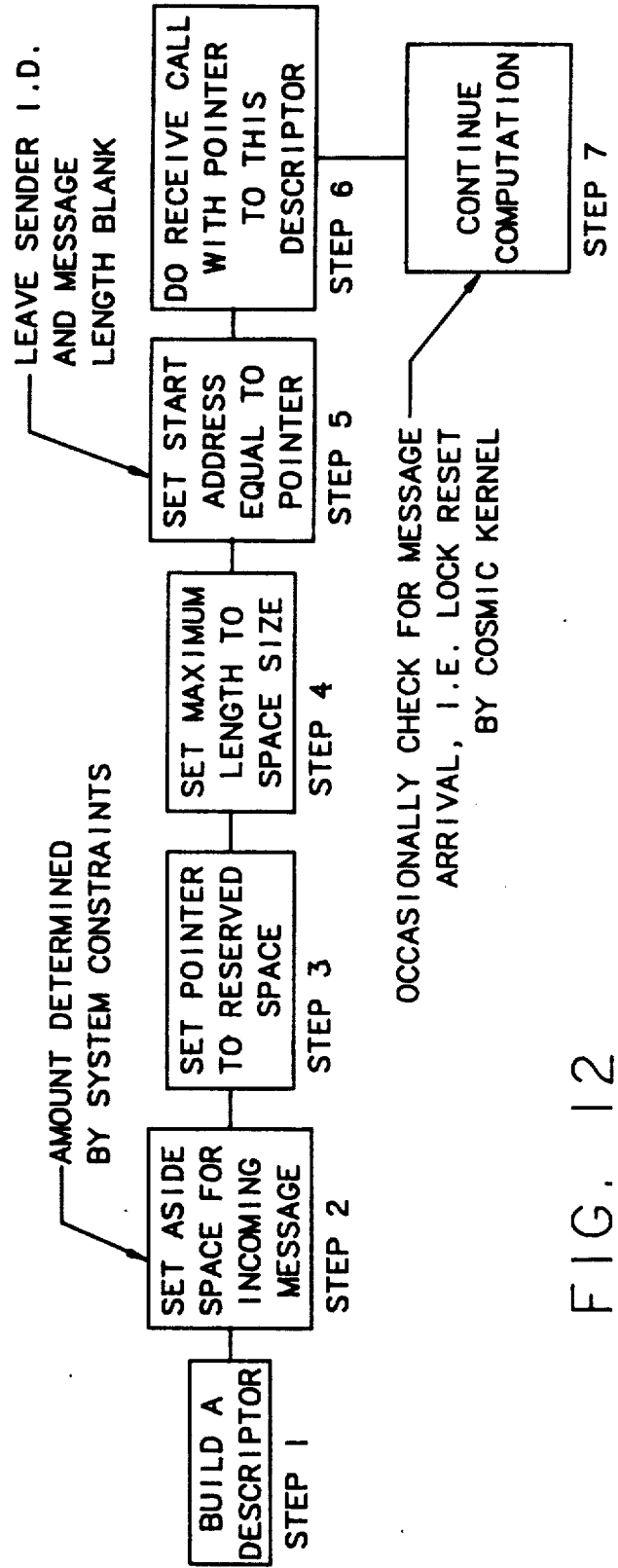
FIG. 12 is a flowchart depicting a typical sequence for a user process to do a RECV.

Turning now to FIG. 12, the typical steps in a sequence for a user process to do a RECV are depicted. These Steps 1 through 7 are mostly self-explanatory, but some of them do require some additional description. It is important to note that the sender identification and the length, as well, of the message are left blank. The system cannot discriminate, but must receive messages from whatever source. For this, reason, these two items are left blank. As noted at Step 7, it is the condition of the lock that determines when the receive has actually taken place.

Figure 13:
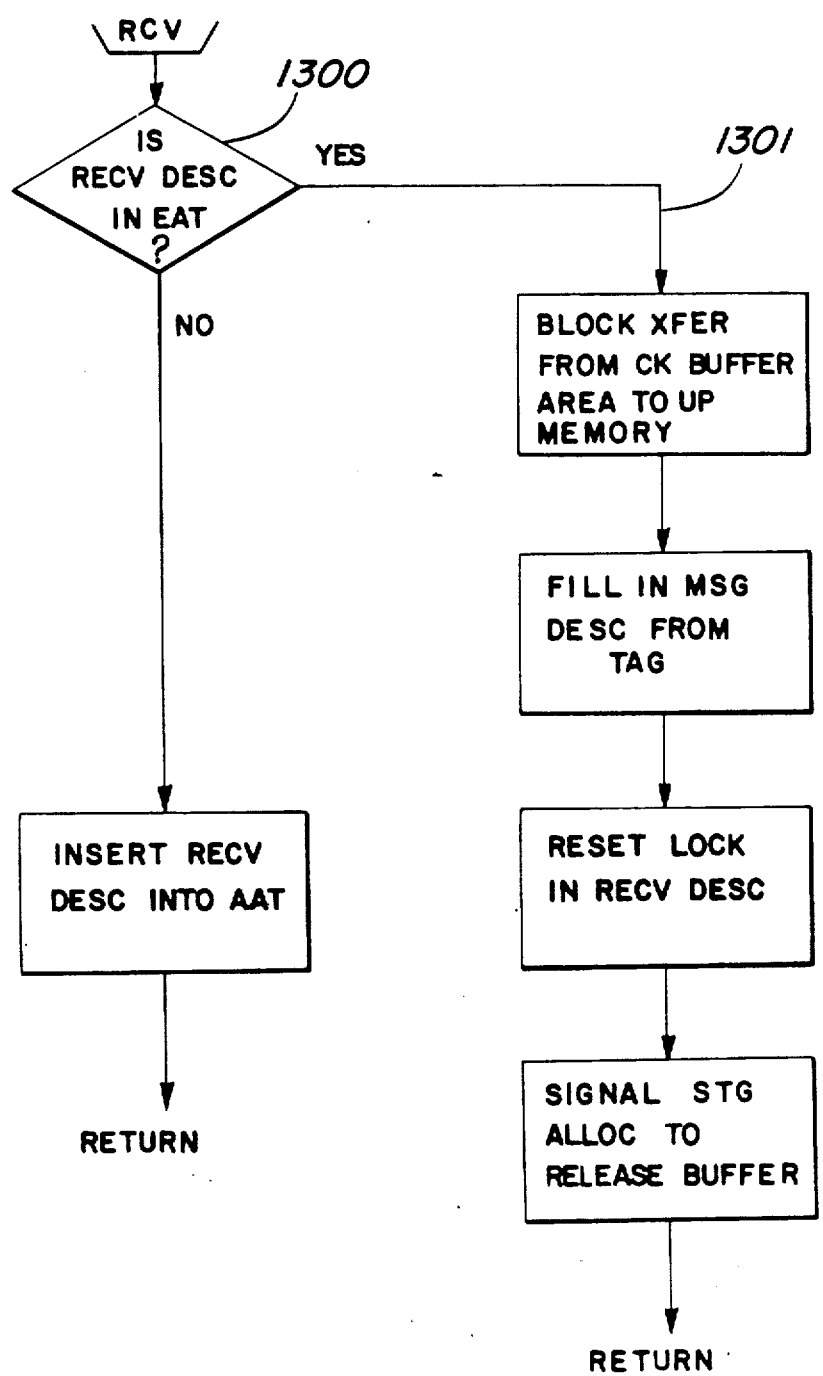
FIG. 13 is a flowchart depicting a RECV call.

Reference is now made to FIG. 13, which depicts the flowchart diagram for a RECV interrupt. It should be noted that an early arrival table (EAT) 902, FIG. 9, is present in each and every node. Somewhere else in the cosmic cube a SEND has been completed. Assume, however, that a corresponding receive has not yet taken place. Anything that comes into the node's controller 901 which matches the descriptor in the early arrival table 902 must be accepted. Stated more generally, the philosophy behind this feature of the invention is that somewhere in the cosmic cube a SEND has been executed. By definition, the e-cube routing algorithm employed by this invention will assure that the message of the executed SEND will work itself to the proper RECV location.

Once at the proper receiver location, the SEND must be matched to its corresponding RECV. Once it is so matched, then the cosmic kernel can move it from the cosmic kernel buffer space into the user process memory space. This order-preserving, message-passing routine is highly important to this invention.

In FIG. 13 decision block 1300 checks the identity of the receive descriptor against the early arrival table list 902, FIG. 9. If the decision is "YES," then the SEND identity is a match with the oldest of the descriptors in the early arrival table and the process can continue. Note from branch 1301 that the first step is to move the message from the cosmic kernel memory space to the user process memory space.

In order to accomplish the transfer, the RECV descriptor is used and the previous blank spaces in the descriptor will be filled in by the cosmic kernel. For example, as noted in FIG. 12, the sender identification and the actual length of the message were left blank. The descriptor address, see tag in FIG. 9, is filled in at Step 2, branch 1301, FIG. 13, and the lock in the RECV descriptor is reset at Step 3 thereof. In FIG. 9, the storage allocator 910 is then signalled to release the buffer space that was previously used for holding ("queuing") the message that has just been transferred from the cosmic kernel buffer area 905 into the user process memory space where it is employed for computation. As soon as the storage allocator has been signalled, as shown at Step 4 of branch 1301, the previous buffer space may now be reused.

Figure 14:
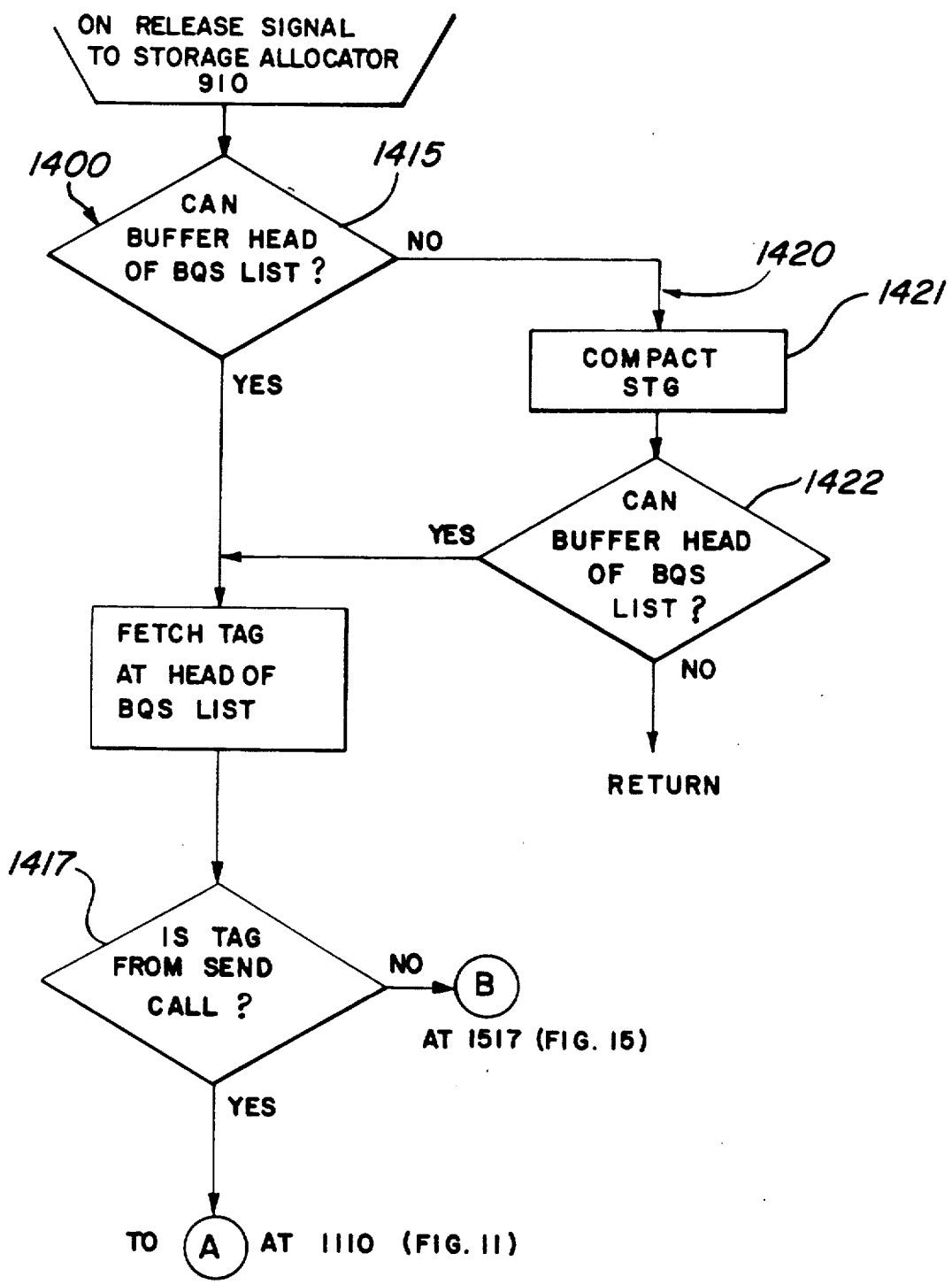
FIG. 14 is a flowchart depicting the operation when a release signal clears the memory space.

FIG. 14 depicts the flowchart of the steps involved in a release signal to the storage allocator 910, FIG. 9. The storage allocator 910 stores the first or oldest message from BQS list 904, FIG. 9. If it can be stored, the location must be assigned in buffer area 905. The assignment is stored in accordance with the message pointer (address) portion of the tag.

Figure 15:
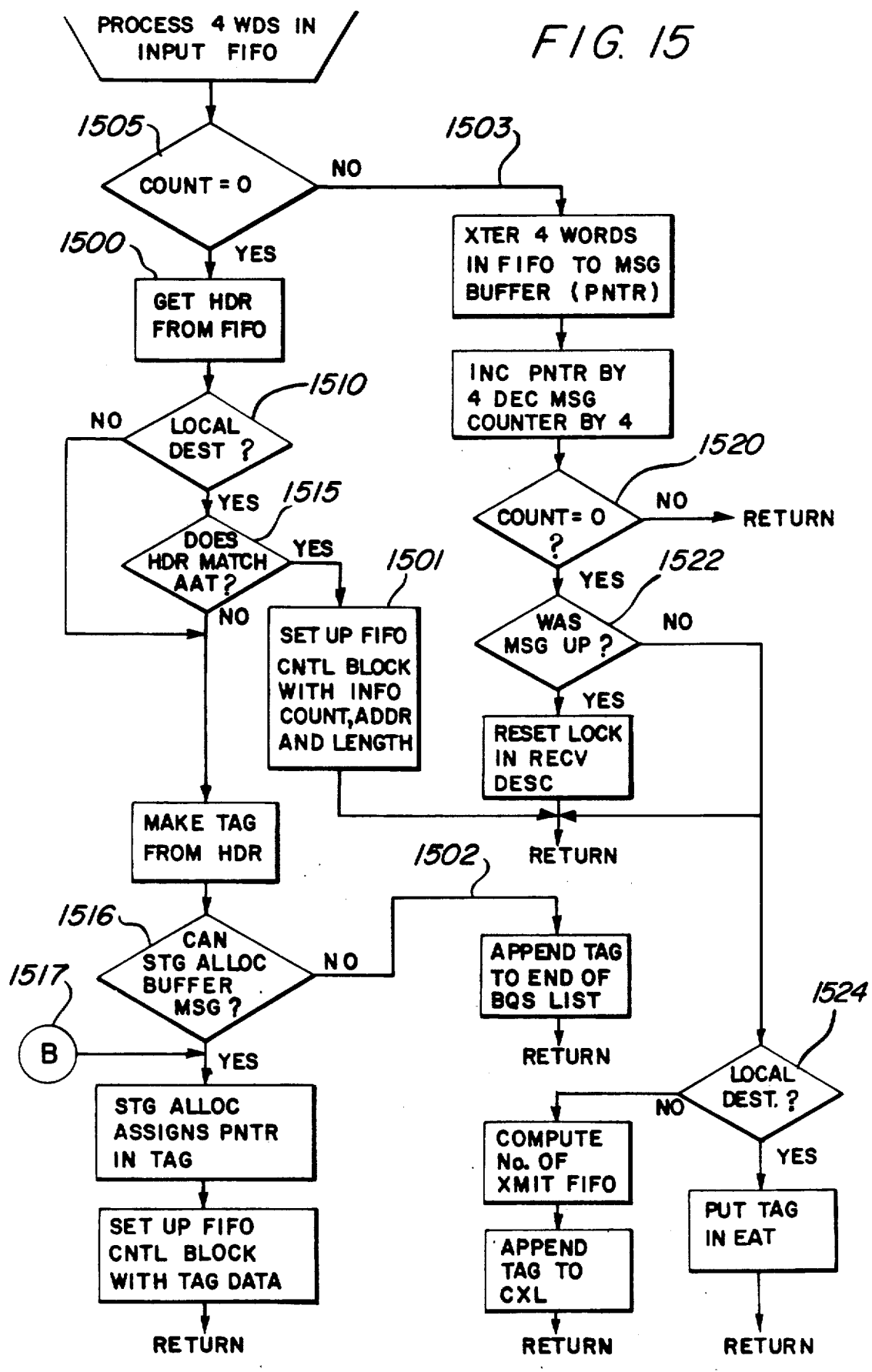
FIG. 15 is a flowchart depicting the processing of words in a transmit ("input") FIFO.

Assume conditions at decision block 1415 yield a YES answer. Note that FIG. 14 has two continuation points, depending on whether the head of the BQS list was from either a blocked SEND or from a channel input. Decision block 1417 determines whether or not the message was blocked on a SEND call (FIG. 11) or on an input FIFO interrupt (FIG. 15). Control is resumed at the appropriate point, as designated by Ⓐ or Ⓑ, FIG. 14. At this point we resume control at the point immediately past where the message was blocked.

If the answer to decision block 1415 is "NO," then an attempt is made to compact various unused portions of storage and thus achieve a larger amount of usable storage space. This compaction operation is shown by Step 1421, FIG. 14. Assuming that compaction fails to achieve sufficient storage space, then the BQS list is left unchanged. Note that no attempt is made to look beyond the front of the BQS list to see if some smaller message could be stored. Only the front of the list must be used in order to preserve message order. This feature is necessary and important for the system of this invention.

At this point in the description of this invention, it is clear that the cosmic kernel has at least two distinct hardware functions. One hardware function is at the input and output of both FIFOs which deliver interrupts to the kernel. Additionally, of course, the kernel responds to software interrupts from the user processes.

The cosmic kernel operation has been described for a SEND and RECV interrupt. These operations insert and remove messages from the message system. In addition, the cosmic kernel is relentlessly buffering messages between processors, i.e., between neighboring nodes. The buffering of such message is accomplished by FIGS. 15 and 16. These two figures respectively show how a four-word packet is processed by an input and an output FIFO.

Whereas SEND and RECV were organized around the user process, cosmic cube message-passing is organized around each of the channels. For each channel there is a channel control block which contains the address of the tag or descriptor that is currently being processed, the count which is the number of words left to be read in for a message, and the message address which points to where the next word is to be stored in or read from. Each output FIFO additionally has a channel transmit list which maintains the sequence of messages in the order to be transmitted.

FIG. 15 depicts the process involved for sequences of four words as passed from a channel through an input FIFO. Initially, the counts in the entire system are set to zero. If the count is zero, as in the case of system initialization, then the system is ready to accept new messages for an input FIFO. This ready condition is shown by decision block 1505, which determines whether it is a new message or whether a message has only been partly processed. If the count is zero, a new message is to be processed and branch 1500 is followed. The first step in branch 1500 is to fetch the header from the input FIFO. In the preferred embodiment, the header is exactly four words long, which is one packet for an input/output cycle. In block 1510, a test is made to see if the message is for this node. If "YES", then the awaiting arrival table 903 is checked to see whether a RECV has been executed that matches the header. If "YES," then branch 1501 is followed and the message to be input is placed directly in user process space. This placement is accomplished by the FIFO control block. The FIFO control requires three pieces of information, namely (a) the count of the control block must be set to the length field in the header; (b) the address of the message descriptor/tag of the control block requires the address of the RECV descriptor; and (c) the message pointer of the control block must be set to the address of the actual message buffer. This last address is where the message must go on a RECV. At this time, the actual length in the receive descriptor is filled in with the length field as dictated by the header. Also, the sender identification is placed into the RECV message descriptor. This identification information comes from the header of the message. The system now returns to await an interrupt for the next four words.

Assume that the header does not have a match in the awaiting arrival table, i.e., the destination is not for this local node. The output from decision block 1515 will be "NO" and an attempt will be made to buffer the message. The header is made into a tag whose message pointer is left blank. Decision block 1516 will consult the storage allocator about the possibility of buffering the message using the data that is provided in the tag. If the storage allocation in decision block 1516 decides "YES," then it will assign an address in the buffer area to the message pointer in the tag. At this point the three items of information, a, b and c (discussed above) are used to load the FIFO control block, except that a tag is used instead of a message descriptor. Then the system returns.

If decision block 1516 is "NO," then the storage allocator knows that the message cannot be stored, so the address of the tag is placed at the end of the block for queue space BQS list. Then the system then returns.

If decision block 1505 decides that the count is not equal to zero, then branch 1503 is followed. Since the count is not at zero, the message passing is in the middle of the message. Accordingly, four more words are transferred to the buffer and the pointer is moved by four. At the same time, the counter is decremented by four. If the count is not zero, the system simply returns; otherwise, a check is made to see if the message was placed in a user process space. If it was, the output of decision block 1522 is "YES" the lock is reset in the RECV descriptor, and the system returns.

If a "NO" decision is made by block 1522, then the message is checked at decision block 1524 to see if it is for this local node. If "YES" from block 1524, then the tag is placed in the early arrival table. Placing the tag in the table will make it a candidate for a match in decision block 1300, FIG. 13. At this point, the determination is made that the message has been completely received, but the message must be forwarded to a neighboring node. The next two steps are completely analogous to the two steps in branch 1102 of FIG. 11.

Figure 16:
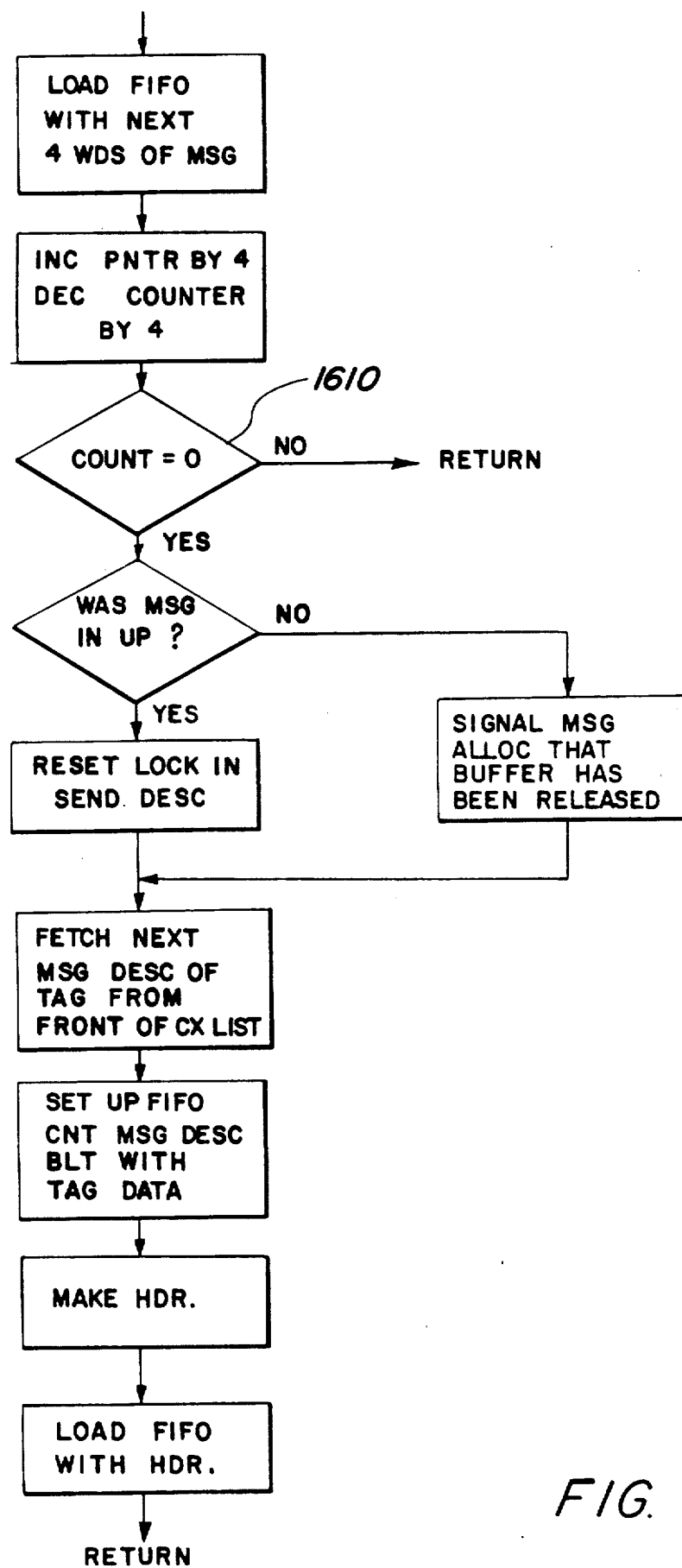
FIG. 16 is a flowchart depicting the processing of words in a receive ("output") FIFO.

The steps involved in processing four words in an output FIFO are detailed in FIG. 16. In view of the extensive description thus far, it is submitted that those steps are self-explanatory to those of ordinary skill in the art and need not be explained further.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

---

ATTACHMENT A

C language process code for the N-body example.

```
/* process for an n-body computation, n odd, with symmetrical forces */
#include "cubedef.h"    /* cube definitions */
#include "force.h"      /* procedures for computing forces and positions */
struct body    { double pos[3];     /* body position x,y,z         */
                 double vel[3];     /* velocity vector x,y,z       */
                 double force[3];   /* to accumulate forces        */
                 double mass;       /* body mass                   */
                 int home_id;       /* id of body's home process   */
               } host, guest;
struct startup { int n;             /* number of bodies            */
                 int next_id;       /* ID of next process on ring  */
                 int steps;         /* number of integration steps */
               } s;
struct desc my_body_in, my_body_out, startup_in;  /* IH channels           */
struct desc body_in, body_out, body_bak;          /* inter-process channels */
cycle () /* read initial state, compute, and send back final state */
{
    int i; double FORCE[3];
    /* initialize channel descriptors */
    /* init(*desc, id, type, buffer_len, buffer_address); */
    init(&my_body_in,  0,0,sizeof(struct body)/2,&host); recv_wait(&my_body_in);
    init(&startup_in,  0,1,sizeof(struct startup)/2,&s); recv_wait(&startup_in);
    init(&my_body_out, IH_ID, 2, sizeof(structbody)/2, &host);
    init(&body_in,     0,     3, sizeof(struct body)/2, &guest);
    init(&body_out,    s.next_id, 3, sizeof(struct body)/2, &guest);
    init(&body_bak,    0,     4, sizeof(struct body)/2, &guest);
    while(s.steps--) /* repeat s.steps computation cycles */
    {
        body_out.buf = &host;                               /* first time send out host body */
        for(i = (s.n-1)/2; i--;)                            /* repeat (s.n-1)/2 times        */
        {
            send_wait(&body_out);                           /* send out the host guest       */
            recv/wait(&body_in);                            /* receive the next guest        */
            COMPUTE_FORCE(&host,&guest,FORCE);              /* calculate force               */
            ADD_FORCE_TO_HOST(&host,FORCE);                 /* may the force be with you     */
            ADD_FORCE_TO_GUEST(&guest,FORCE);               /* and with the guest, also      */
            body_out.buf = &guest;                          /* prepare to pass the guest     */
        }
        body_bak.id = guest.home_id;
        send_wait(&body_bak); recv_wait(&body_bak);         /* send guest back               */
        ADD_GUEST_FORCE_TO_HOST(&host,&guest);              /* the envoy returns             */
        UPDATE(&host);                                      /* integrate position            */
    }
    send_wait(&my_body_out);  /* send body back to host, complete one cycle */
}
main() { while(1) cycle(); }     /* main execute cycle repeatedly */
```

---

What is claimed is:

1. In a computer system of the binary n-cube type wherein a plurality of computing nodes are interconnected by point-to-point, bidirectional, asynchronous communications channels for the transmission of messages between user process programs executing in ones of the computing nodes, the improved communication system for the prevention of system blockout comprising:
   a) input means at each of the computing nodes connected for receiving messages input to the computing node from communication input channels connected thereto, said input mans including input buffer means for interfacing with said communication input channels connected thereto and for initially receiving said messages;
   b) output means at each of the computing nodes connected for transmitting messages output from the computing node to communication output channels connected thereto, said output means including output buffer means for interfacing with said communication output channels connected thereto and for holding said messages prior to and during transmission thereof;
   c) kernel program means at each of the computing nodes for acting as an interface between the user process programs executing in the computing node and said input and output means and for exclusively controlling the receiving and transmitting of messages into and out of the computing node;
   d) means for allowing the user process programs to pass control to said kernel program means in order to request the sending and receiving of messages on their behalf by said kernel program means; and
   e) a lock bit associated with each said output buffer means which lock bit has conditions of locked and unlocked which are sensible by the user process programs and set by said kernel program means to a locked condition when a message is placed in said output buffer and set by said kernel program means to an unlocked condition when a message therein has been transferred out of said output buffer means so that said output buffer means is available to receive a new message.

2. The improvement to a communication system for prevention of blockout in a binary n-cube type computer system of claim 1 and additionally comprising:

logic means included within each said kernel program for preventing said kernel program of one computing node from sending a message to another computing node unless a user process program in said other computing node has requested said kernel program of said other computing node to receive a message on said user process program's behalf.

3. The improvement to a communication system for prevention of blockout in a binary n-cube type computer system of claim 1 and additionally comprising:

blockout avoidance logic means included within each said kernel program for sensing a message length indicator included within a header portion of each message, for receiving only that portion of a message for which a user process program in the computing node has reserved a portion of said input buffer means of said computing node of a given size, and for informing the user process program for whom the received message is intended that said message as sent was of a size longer than the size of said portion of said input buffer means reserved by said user process program.

4. The improvement to a communication system for prevention of blockout in a binary n-cube type computer system of claim 1 and additionally comprising:

filter logic means included with each said kernel program for sensing a message type indicator included within a header portion of each message and for refusing to receive a message unless a user process program in the computing node has requested said kernel program of said computing node to receive a message having a message type indicator the same as the message type indicator of said message on said user process program's behalf.

5. The improvement to a communication system for prevention of blockout in a binary n-cube type computer system of claim 4 wherein:

said filter logic means includes logic means for making and maintaining a list of messages waiting to be received for which a request to receive a message having message type indicator the same as any of said messages has not yet been made.

6. The improvement to a communication system for prevention of blockout in a binary n-cube type computer system of claim 1 and additionally comprising:

blockout prevention logic means included within each said kernel program for sensing a message length indicator included within a header portion of each message and for refusing to receive a message unless a user process program in the computing node has reserved a portion of said input buffer means of said computing node of sufficient size to receive a message of the indicated size.

7. The improvement to a communication system for prevention of blockout in a binary n-cube type computer system of claim 6 wherein:

said blockout preventing logic means includes logic means for listing messages waiting to be received for which adequate space has not yet been reserved.

* * * * *